US011101695B2

(12) United States Patent
Yeo et al.

(10) Patent No.: US 11,101,695 B2
(45) Date of Patent: Aug. 24, 2021

(54) ELECTRONIC DEVICE FOR WIRELESSLY RECEIVING POWER AND METHOD FOR OPERATING THE SAME

(71) Applicants: Samsung Electronics Co., Ltd., Suwon-si (KR); RESEARCH & BUSINESS FOUNDATION SUNGKYUNKWAN UNIVERSITY, Suwon-si (KR)

(72) Inventors: Sung-Ku Yeo, Seoul (KR); Sang-Yun Kim, Suwon-si (KR); Jae-Seok Park, Yongin-si (KR); Young-Ho Ryu, Yongin-si (KR); Kang-Yoon Lee, Seoul (KR); Hamed Abbasizadeh, Suwon-si (KR); Sang-Wook Kwon, Seoul (KR); Thi Kim Nga Truong, Suwon-si (KR); Dong-In Kim, Seongnam-si (KR); Sung-Bum Park, Suwon-si (KR); Dong-Soo Lee, Dangjin-si (KR); Seung Il Huh, Yongin-si (KR)

(73) Assignees: Samsung Electronics Co., Ltd., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 726 days.

(21) Appl. No.: 15/965,274

(22) Filed: Apr. 27, 2018

(65) Prior Publication Data

US 2018/0316225 A1  Nov. 1, 2018

Related U.S. Application Data

(60) Provisional application No. 62/491,521, filed on Apr. 28, 2017, provisional application No. 62/541,953, filed on Aug. 7, 2017.

(30) Foreign Application Priority Data

Aug. 4, 2017  (KR) .................. 10-2017-0098947
Jan. 30, 2018  (KR) .................. 10-2018-0011587

(51) Int. Cl.
*H02J 7/00* (2006.01)
*H02J 7/14* (2006.01)
(Continued)

(52) U.S. Cl.
CPC .............. *H02J 50/12* (2016.02); *H02J 7/00* (2013.01); *H02J 7/025* (2013.01); *H02J 50/20* (2016.02); *H02J 50/70* (2016.02); *H02M 7/2173* (2013.01)

(58) Field of Classification Search
USPC ........................................................ 320/134
See application file for complete search history.

(56) References Cited

U.S. PATENT DOCUMENTS 7,319,347 B2 *  1/2008  Cho ................... H03K 17/6874
                                                    327/111
2002/0008496 A1 *  1/2002  Shamoto ................. H02J 7/342
                                                    320/116
(Continued)

*Primary Examiner* — Alexis B Pacheco
(74) *Attorney, Agent, or Firm* — Jefferson IP Law, LLP

(57) ABSTRACT

An electronic device is provided. The electronic device includes a receiving circuit configured to wirelessly receive power and output AC power, a rectifying circuit configured to rectify the AC power from the receiving circuit, wherein the rectifying circuit may include a first P-MOSFET configured to transfer a positive amplitude of power to an output terminal of the rectifying circuit while the AC power has the positive amplitude and to prevent transferring a negative amplitude of power to the output terminal of the rectifying circuit while the AC power has the negative amplitude, and a forward loss compensating circuit connected with the first P-MOSFET configured to reduce a threshold voltage of the (Continued)

first P-MOSFET while the AC power has the positive amplitude.

11 Claims, 16 Drawing Sheets

(51) Int. Cl.
*H02J 50/12* (2016.01)
*H02J 50/70* (2016.01)
*H02J 7/02* (2016.01)
*H02M 7/217* (2006.01)
*H02J 50/20* (2016.01)

(56) References Cited

U.S. PATENT DOCUMENTS

| | | | |
|---|---|---|---|
| 2013/0221758 A1* | 8/2013 | Kai | H02J 7/025 |
| | | | 307/104 |
| 2013/0314951 A1 | 11/2013 | Harrison | |
| 2014/0035383 A1 | 2/2014 | Riehl | |
| 2014/0097791 A1* | 4/2014 | Lisuwandi | H02J 7/00 |
| | | | 320/108 |
| 2014/0225439 A1* | 8/2014 | Mao | H02J 50/80 |
| | | | 307/31 |
| 2015/0349538 A1 | 12/2015 | Agostinelli et al. | |
| 2016/0043562 A1 | 2/2016 | Lisi et al. | |
| 2017/0018973 A1* | 1/2017 | Murayama | B60L 53/126 |
| 2017/0098966 A1* | 4/2017 | Walley | H02M 7/219 |
| 2017/0126004 A1* | 5/2017 | Voigt | H02J 7/0034 |
| 2020/0052607 A1* | 2/2020 | Telefus | H02J 3/00 |

\* cited by examiner

ELECTRONIC DEVICE FOR WIRELESSLY RECEIVING POWER AND METHOD FOR OPERATING THE SAME

CROSS-REFERENCE TO RELATED APPLICATION(S)

This application is based on and claims the benefit under 35 U.S.C. § 119(e) of a U.S. Provisional application Ser. No. 62/491,521, filed on Apr. 28, 2017, in the United States Patent and Trademark Office, and under 35 U.S.C. § 119(e) of a U.S. Provisional application Ser. No. 62/541,953, filed on Aug. 7, 2017, in the United States Patent and Trademark Office and under 35 U.S.C. § 119(a) of a Korean patent application number 10-2017-0098947, filed on Aug. 4, 2017, in the Korean Intellectual Property Office, and under 35 U.S.C. § 119(a) of a Korean patent application number 10-2018-0011587, filed on Jan. 30, 2018, in the Korean Intellectual Property, the disclosures of which are incorporated by reference herein in their entirety.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. This invention was made with Korean government support under the Engineering Research Center (ERC) from the National Research Foundation of Korea (Project No.: 2014R1A5A1011478) awarded by the Ministry of Science, ICT and Future Planning. The parties to the joint research agreement are 1) Samsung Electronics Co., Ltd. and 2) Research and Business Foundation Sungkyunkwan University.

TECHNICAL FIELD

The disclosure relates to electronic devices wirelessly receiving power and methods for operating the same. More particularly, the disclosure relates to wirelessly receiving power and performing rectification using one or more of a plurality of rectifying circuits based on a magnitude of the received power.

BACKGROUND

Portable digital communication devices have become must-have items for modern people. Customers desire to receive various high-quality services anytime and anywhere. Recently, Internet of Things (IoT) technology has been introduced that bundles various sensors, home appliances, and communication devices into a single network. However, such a diversity of sensors requires a wireless power transmission system for seamless operations.

Wireless power transmission may be performed using a magnetic induction, a magnetic resonance, or an electromagnetic wave scheme. The magnetic induction or magnetic resonance scheme is advantageous in charging electronic devices positioned within a relatively short distance from the wireless power transmitter. The electromagnetic wave scheme is more advantageous for remote power transmission that reaches a few meters as compared with the magnetic induction or magnetic resonance scheme. Such electromagnetic wave-type is primarily intended for remote power transmission and may exactly grasp the location of remote power receivers and deliver power in a most efficient way.

A wireless power receiving electronic device may receive and rectify an alternating current (AC) waveform of power. A rectifying circuit included in the electronic device may include a p-type, metal-oxide-semiconductor field-effect transistor (P-MOSFET). However, the P-MOSFET may cause forward loss and reverse leakage loss. For example, where the P-MOSFET is controlled in an "on" state, a loss may arise due to the threshold voltage of the P-MOSFET, which is called a forward loss. For further example, although the P-MOSFET should be controlled in an "off" state, a reverse current may occur through the P-MOSFET, which is called a reverse leakage loss. Where the electronic device wirelessly receives a relatively small magnitude of power, the loss caused by the rectifying circuit in this way may have a significant effect on the overall efficiency.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a system and method for wirelessly receiving power and performing rectification using one or more of a plurality of rectifying circuits based on a magnitude of the received power.

In accordance with an aspect of the disclosure, an electronic device is provided. The electronic device includes a rectifying circuit which is able to prevent forward loss and reverse leakage loss and a method for operating the electronic device.

In accordance with another aspect of the disclosure, an electronic device is provided. The electronic device includes a receiving circuit configured to wirelessly receive power and output alternating current (AC) power, and a rectifying circuit configured to rectify the AC power from the receiving circuit. The rectifying circuit may include a first P-MOSFET configured to transfer a positive amplitude of power to an output terminal of the rectifying circuit while the AC power has the positive amplitude and to prevent transferring a negative amplitude of power to the output terminal of the rectifying circuit while the AC power has a negative amplitude. The rectifying circuit may also include a forward loss compensating circuit connected with the first P-MOSFET and configured to reduce a threshold voltage of the first P-MOSFET while the AC power has the positive amplitude.

In accordance with another aspect of the disclosure, an electronic device is provided. The electronic device includes a receiving circuit configured to wirelessly receive power and output AC power, a plurality of rectifying circuits configured to rectify the AC power from the receiving circuit, a sensor configured to sense a magnitude of the received power, and a control circuit including, for example, at least one processor, wherein the control circuit may be configured to obtain the magnitude of the received power from the sensor, select a rectifying circuit to perform rectification from among the plurality of rectifying circuits based on the magnitude of the received power, and perform control to rectify the AC power output from the receiving circuit using the selected rectifying circuit.

In accordance with another aspect of the disclosure, a method for operating an electronic device is provided. The method includes wirelessly receiving power, obtaining a magnitude of the received power, selecting a rectifying circuit to perform rectification from among a plurality of rectifying circuits based on the magnitude of the received power, and rectifying the received power using the selected rectifying circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, wherein.

Throughout the drawings, like reference numerals will be understood to refer to like parts, components, and structures.

DETAILED DESCRIPTION

Figure 1:
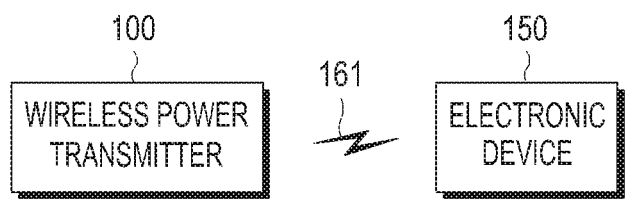
FIG. 1 is a block diagram illustrating a wireless power transmitter and an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

This invention was made with Korean government support under the Engineering Research Center (ERC) from the National Research Foundation of Korea (Project No.: 2014R1A5A1011478) awarded by the Ministry of Science, ICT and Future Planning.

Hereinafter, embodiments of the disclosure are described with reference to the accompanying drawings. However, it should be appreciated that the disclosure is not limited to the embodiments and the terminology used herein, and all changes and/or equivalents or replacements thereto are also within the scope of the disclosure. The same or similar reference denotations may be used to refer to the same or similar elements throughout the specification and the drawings. As used herein, the terms "A or B" or "at least one of A and/or B" may include all possible combinations of A and B. As used herein, the terms "first" and "second" may modify various components regardless of importance and/or order, and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the same context. The term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the wireless power transmitter or electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the wireless power transmitter or electronic device may include at least one of a television, a set-top box wiredly or wirelessly interworking with a TV, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, an electric car, or an electronic picture frame.

According to an embodiment of the disclosure, the wireless power transmitter or the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the wireless power transmitter or electronic device may include at least one of a part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the wireless power transmitter or electronic device may also be flexible, and may be a combination of the above-enumerated electronic devices. According to an embodiment of the disclosure, the wireless power transmitter or electronic device is not limited to the above-listed embodiments. As used herein, the term "user" may denote a human using the electronic device or another device (e.g., an artificial intelligent electronic device) using the wireless power transmitter or electronic device.

FIG. 1 is a block diagram illustrating a wireless power transmitter and an electronic device according to an embodiment of the disclosure.

Referring to FIG. 1, a wireless power transmitter 100 may wirelessly transmit power 161 to an electronic device 150. The wireless power transmitter 100 may transmit the power 161 to the electronic device 150 according to various charging schemes. For example, the wireless power transmitter 100 may transmit power 161 as per an induction scheme, but embodiments are not limited thereto. Adopting the induction scheme, the wireless power transmitter 100 may include, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may constitute a resonance circuit. The wireless power transmitter 100 may be implemented in a scheme defined in the wireless power consortium (WPC) standards (or Qi standards). The wireless power transmitter 100 may also transmit power 161 as per a resonance scheme. Adopting the resonance scheme, the wireless power transmitter 100 may include, e.g., a power source, a DC-AC converting circuit, an amplifying circuit, an impedance matching circuit, at least one capacitor, at least one coil, and an out-band communication circuit (e.g., a Bluetooth low energy (BLE) communication circuit). The at least one capacitor and the at least one coil may constitute a resonance circuit. The wireless power transmitter 100 may be implemented in a scheme defined in the alliance for wireless power (A4WP) standards (or air fuel alliance (AFA) standards). The wireless power transmitter 100 may include a coil that is capable of producing a magnetic field when letting an electric current flow thereacross by a resonance or induction scheme. The process of the wireless power transmitter 100 producing an induced magnetic field may be represented as the wireless power transmitter 100 wirelessly transmitting the power 161. Further, the electronic device 150 may include a coil that produces an induced electromotive force by the magnetic field generated around and varying in magnitude over time. The process of the electronic device 150 producing an induced electromotive force through the coil may be represented as the electronic device 150 wirelessly receiving the power 161. The wireless power transmitter 100 may also transmit power 161 as per an electromagnetic wave scheme. Adopting the electromagnetic scheme, the wireless power transmitter 100 may include, e.g., a power source, a DC-AC converting circuit, an amplifying circuit, a distributing circuit, a phase shifter, a power transmission antenna array including a plurality of patch antennas, and an out-band communication circuit (e.g., a BLE communication module). The plurality of patch antennas each may form a radio frequency (RF) wave (e.g., an electromagnetic wave). The electronic device 150 may include patch antennas capable of outputting electric current using generated RF waves. The process of the wireless power transmitter 100 producing an RF wave may be represented as the wireless power transmitter 100 wirelessly transmitting the power 161. The process of the electronic device 150 receiving electric current from the patch antennas using RF waves may be represented as the electronic device 150 wirelessly receiving the power 161.

According to an embodiment of the disclosure, the wireless power transmitter 100 may also communicate with the electronic device 150. For example, the wireless power transmitter 100 may communicate with the electronic device 150 as per an in-band scheme. The wireless power transmitter 100 or the electronic device 150 may vary the load (or impedance) on the data to be transmitted, according to, e.g., an on/off keying modulation scheme. The wireless power transmitter 100 or the electronic device 150 may determine data transmitted from its opposite device by measuring a variation in load or impedance based on a variation in the current, voltage, or power across the coil. The wireless power transmitter 100 may also communicate with the electronic device 150 as per an out-band scheme. The wireless power transmitter 100 or the electronic device 150 may communicate data using a communication circuit (e.g., a BLE communication module) provided separately from the coil or patch antennas.

As set forth herein, the description where the "wireless power transmitter 100, the electronic device 150, or another electronic device performs a particular operation" may mean that various hardware devices, e.g., a control circuit, such as a processor, a coil, or a patch antenna, included in the wireless power transmitter 100, the electronic device 150, or the other electronic device, performs the particular operation. The description where the "wireless power transmitter 100, the electronic device 150, or another electronic device performs a particular operation" may also mean that the processor controls another hardware device to perform the particular operation. The description where the "wireless power transmitter 100, the electronic device 150, or another electronic device performs a particular operation" may also mean that the processor or another hardware device triggers the particular operation as an instruction for performing the particular operation, which is stored in a storage circuit (e.g., a memory) of the wireless power transmitter 100, the electronic device 150, or the other electronic device.

Figure 2:
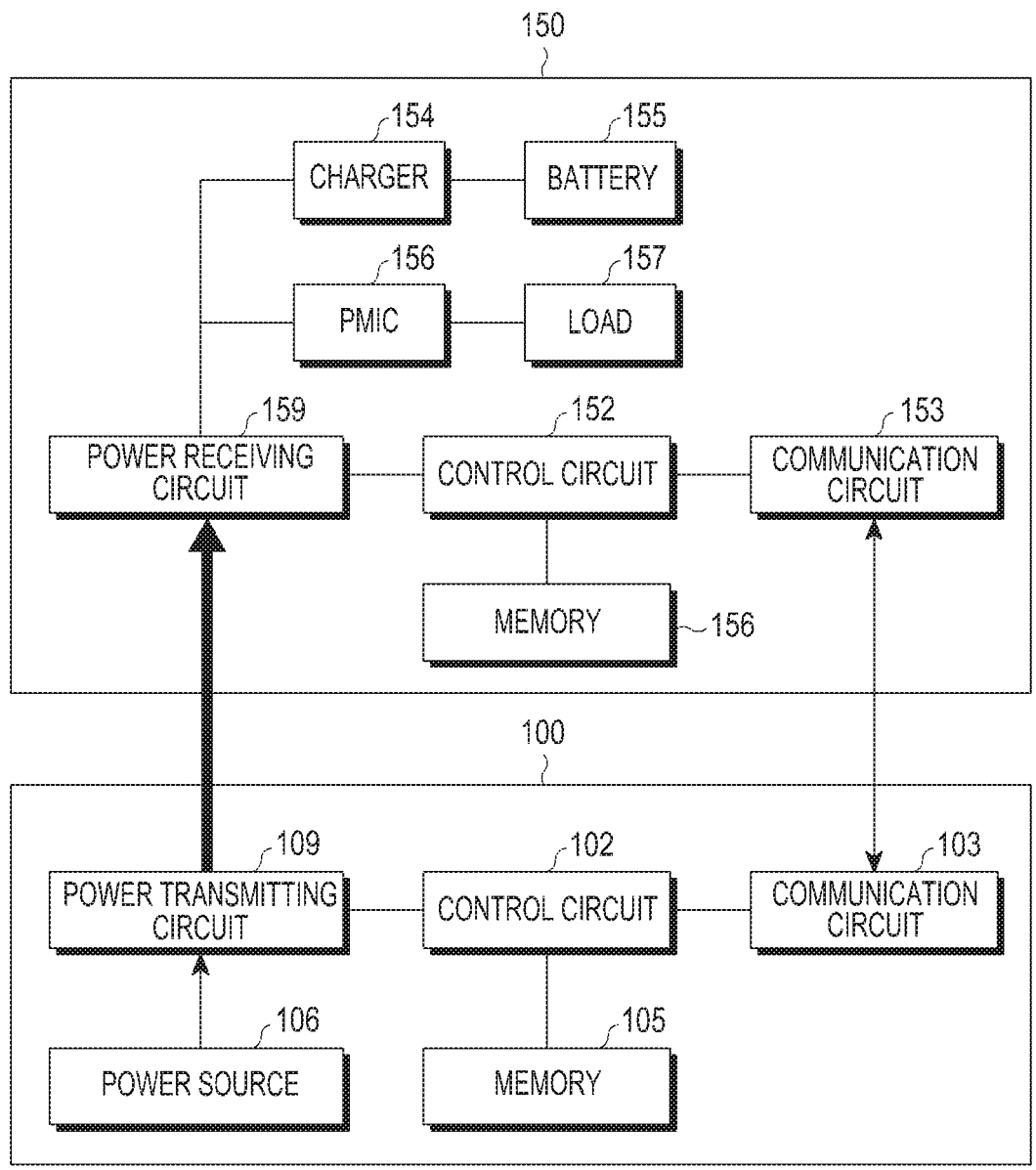
FIG. 2 is a block diagram illustrating a wireless power transmitter and an electronic device according to an embodiment of the disclosure.

FIG. 2 is a block diagram illustrating a wireless power transmitter and an electronic device according to an embodiment of the disclosure.

Referring to FIG. 2, the wireless power transmitter 100 may include a power transmitting circuit 109, a control circuit 102, a communication circuit 103, a memory 105, and a power source 106. According to an embodiment of the disclosure, the electronic device 150 may include a power receiving circuit 159, a control circuit 152, a communication circuit 153, a memory 156, a charger 154, a battery 155, a power management integrated circuit (PMIC) 156, and a load 157.

According to an embodiment of the disclosure, the power transmitting circuit 109 may wirelessly transmit power as per at least one of an induction scheme, a resonance scheme, or an electromagnetic wave scheme, to the power receiving circuit 159. The detailed configurations of the power transmitting circuit 109 and the power receiving circuit 159 are described below in greater detail with reference to FIGS. 3A and 3B. The control circuit 102 may control the magnitude of power that the power transmitting circuit 109 transmits. For example, the control circuit 102 may control the magnitude of power output from the power source 106 and control the gain of a power amplifier included in the power transmitting circuit 109, thereby controlling the magnitude of power that the power transmitting circuit 109 transmits. The control circuit 102 may adjust the magnitude of power output from the power source 106 by controlling the duty cycle or frequency of power output from the power source 106. The power source 106 may include, e.g., a power interface connectable to an outlet. The power source 106 may receive AC power, which has a voltage set per country, from the outlet and send the power to the power transmitting circuit 109.

The control circuit 102 may control the magnitude of power applied to the power transmitting circuit 109 by controlling the magnitude of a bias voltage of the power amplifier. The control circuit 102 or the control circuit 152 may be implemented in various circuits capable of performing calculation, such as a central processing unit (CPU) or other general-purpose processor, a mini-computer, a microprocessor, a micro controlling unit (MCU), or a field programmable gate array (FPGA), but embodiments are not limited thereto.

According to an embodiment of the disclosure, the power receiving circuit 159 may wirelessly receive power as per at least one of an induction scheme, a resonance scheme, or an electromagnetic wave scheme from the power transmitting circuit 109. The power receiving circuit 159 may perform power processing, such as rectifying a received AC power into a DC waveform, converting the voltage, or regulating the power. The charger 154 may charge the battery 155 of the electronic device 150. The charger 154 may charge the battery 155 in a constant voltage (CV) mode or a constant current (CC) mode, but embodiments are not limited thereto. The PMIC 156 may adjust the power into a voltage or current appropriate for the connected load 157 and provide the adjusted power to the load 157. The control circuit 152 may control the overall operation of the electronic device 150. The memory 156 may store instructions to perform the overall operation of the electronic device 150. The memory 105 may store instructions to perform the overall operation of the wireless power transmitter 100. The memory 105 and the memory 156 may be implemented in various types, such as a read only memory (ROM), a random-access memory (RAM), or a flash memory, but embodiments are not limited thereto.

Figure 3A:
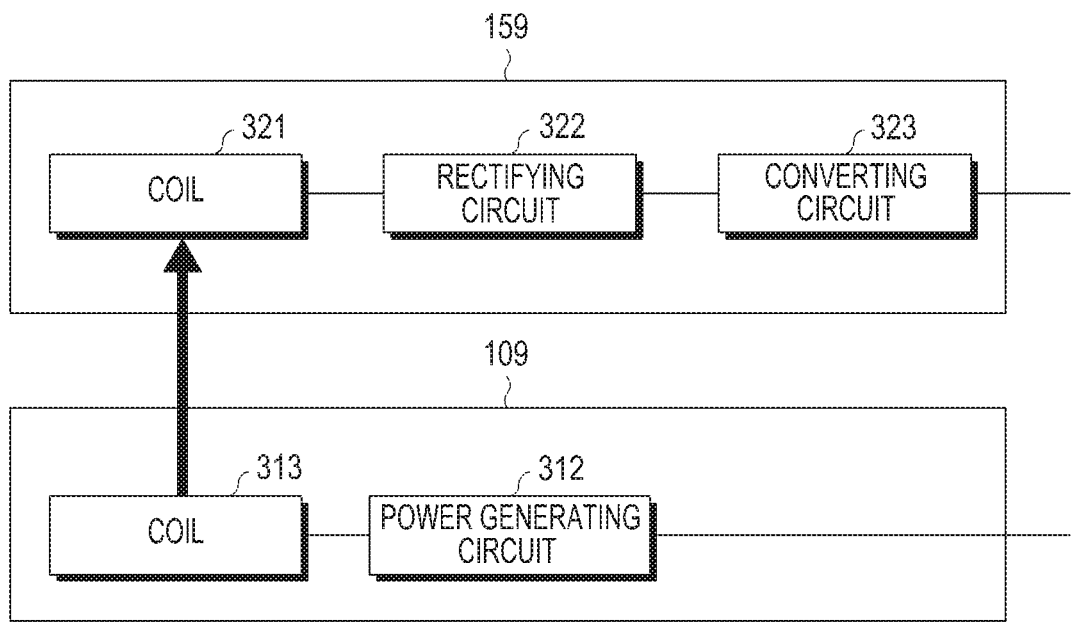
FIG. 3A is a block diagram illustrating a power transmitting circuit and a power receiving circuit as per an induction scheme or resonance scheme according to an embodiment of the disclosure.

FIG. 3A is a block diagram illustrating a power transmitting circuit and a power receiving circuit as per an induction scheme or resonance scheme according to an embodiment of the disclosure.

Referring to FIG. 3A, the power transmitting circuit 109 may include a power generating circuit 312 and a coil 313. The power generating circuit 312 may rectify AC power received from an outside source, invert the rectified power, and provide the inverted power to the coil 313. By inverting the rectified power, maximum voltages and zero voltages may alternately be applied to the coil 313 at preset cycles, producing a magnetic field along the coil 313. The inverting frequency, i.e., the frequency of the AC waveform applied to the coil 313, may be typically set to a value from 100 kHz to 205 kHz, or as high as 6.78 MHz depending on a use standard, but embodiments are not limited thereto. When power is applied to the coil 313, an induced magnetic field that varies in magnitude over time may be produced across the coil 313, thus allowing for wireless transmission of power. Although not shown, capacitors that, along with the coil 313, constitute a resonance circuit may further be included in the power transmitting circuit 109. An induced electromotive force may be generated at a coil 321 of the power receiving circuit 159 by the magnetic field which varies in magnitude over time, and accordingly, the power receiving circuit 159 may wirelessly receive power. A rectifying circuit 322 may rectify the AC waveform of power received. A converting circuit 323 may adjust the voltage of the power rectified and transfer the voltage to remaining hardware of the device. The power receiving circuit 159 may further include a regulator. Alternatively, the converting circuit 323 may be replaced with a regulator.

Figure 3B:
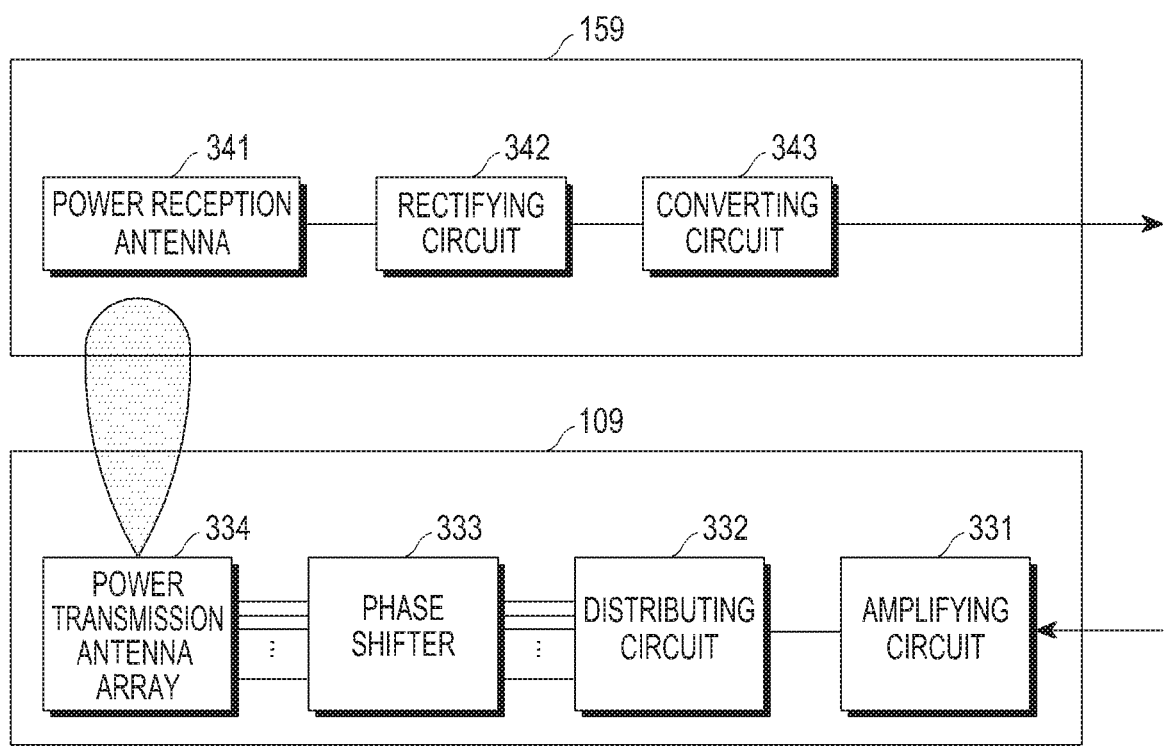
FIG. 3B is a block diagram illustrating a power transmitting circuit and a power receiving circuit as per an electromagnetic wave scheme according to an embodiment of the disclosure.

FIG. 3B is a block diagram illustrating a power transmitting circuit and a power receiving circuit as per an electromagnetic wave scheme according to an embodiment of the disclosure.

Referring to FIG. 3B, the power transmitting circuit 109 may include an amplifying circuit 331, a distributing circuit 332, a phase shifter 333, and a power transmission antenna array 334. According to an embodiment of the disclosure, the power receiving circuit 159 may include a power reception antenna 341, a rectifying circuit 342, and a converting circuit 343.

The amplifying circuit 331 may amplify the power received from the power source 106 and provide the power to the distributing circuit 332. The amplifying circuit 331 may be implemented as various amplifiers, such as a drive amplifier (DA), a high-power amplifier (HPA), or a gain block amplifier (GBA), or a combination thereof, but embodiments are not limited thereto. The distributing circuit 332 may distribute the power output from the amplifying circuit 331 along a plurality of paths. Any circuit capable of distributing input power or signal along a plurality of paths may serve as the distributing circuit 332. For example, the distributing circuit 332 may distribute power along as many paths as a number of patch antennas included in the power transmission antenna array 334. The phase shifter 333 may phase-shift (or delay) each of the plurality of AC power signals provided from the distributing circuit 332. There may be provided a plurality of phase shifters 333. For example, the number of the phase shifters 333 may be the same as the number of patch antennas included in the power transmission antenna array 334. A hardware device, such as the HMC642 or the HMC1113, may be used as the phase shifter 333. The degree of shifting by each phase shifter 333 may be controlled by the control circuit 102. The control circuit 102 may determine the location of the electronic device 150 and may phase-shift each of the plurality of AC power signals to allow the RF waves to constructively interfere with each other (i.e., to be beamformed) in the location of the electronic device 150 (or the location of the power reception antenna 341). Each of the plurality of patch antennas included in the power transmission antenna array 334 may generate a sub RF wave based on the received power. The RF waves, which result from interference among the sub RF waves, may be converted into current, voltage, or power at the power reception antenna 341 and be outputted. The power reception antenna 341 may also include a plurality of patch antennas. The power reception antenna 341 may use ambient RF waves, i.e., electromagnetic waves, to produce AC waveforms of current, voltage, or power which may be referred to as "received power." The rectifying circuit 342 may rectify the received power into a DC waveform. The converting circuit 343 may increase or decrease the voltage of the DC waveform of power to a preset value and output the power to the PMIC 156.

According to an embodiment of the disclosure, at least one of the power transmitting circuit 109 or the power receiving circuit 159 may include the hardware according to the induction scheme or resonance scheme of FIG. 3A or the hardware according to the electromagnetic wave scheme of FIG. 3B. In this case, the control circuit 102 or the control circuit 152 may choose a charging scheme as per various conditions and may control the hardware corresponding to the chosen charging scheme to be driven. The control circuit 102 or the control circuit 152 may adopt all of the induction scheme or resonance scheme, and the electromagnetic wave scheme, and may drive the hardware included to transmit and receive power.

The coil 321 which produces AC power using its ambient magnetic field or the power reception antenna 341 which produces AC power using its ambient RF waves, may be referred to as a receiving circuit.

Figure 4A:
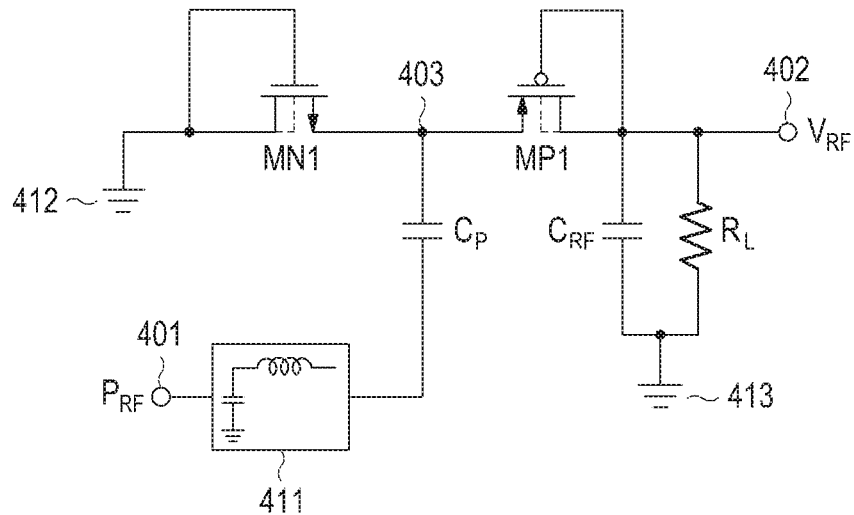
FIG. 4A is a view illustrating a rectifying circuit according to a comparative example for comparison with an embodiment of the disclosure.

FIG. 4A is a view illustrating a rectifying circuit according to a comparative example for comparison with an embodiment of the disclosure.

Figure 4B:
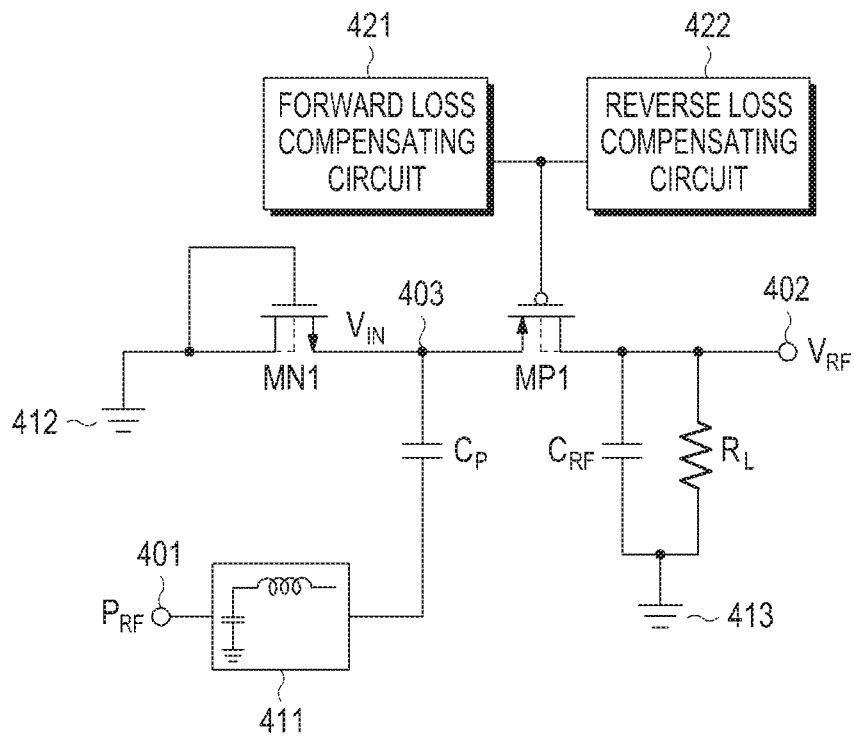
FIG. 4B is a view illustrating a rectifying circuit according to an embodiment of the disclosure.

FIG. 4B is a view illustrating a rectifying circuit according to an embodiment of the disclosure.

Referring to FIG. 4A, an input terminal 401 of a rectifying circuit as per the comparative example may be connected to a coil (e.g., the coil 321) for power reception or a power reception antenna (e.g., the antenna 341). An AC power (PRF) may be provided from a coil (e.g., the coil 321) or a power reception antenna (e.g., the antenna 341) to the input terminal 401. A matching circuit 411 may be connected to the input terminal 401. The matching circuit 411 may include at least one of a capacitor or coil. The matching circuit 411 may perform an impedance matching between the electronic device 150 and the wireless power transmitter 100. The matching circuit 411 may be connected to the capacitor CP, and a node 403 may be connected to the capacitor CP. The source of a first P-MOSFET MP1 and the source of a first N-MOSFET MN1 may be connected to the node 403. The gate of the first N-MOSFET MN1 may be connected to the drain of the first N-MOSFET MN1 to be grounded at ground 412, and the gate of the first P-MOSFET MP1 may be connected to the drain of the first P-MOSFET MP1 and an output terminal 402. A capacitor CRF and a resistor RL may be connected in parallel with each other between the first P-MOSFET MP1 and the output terminal 402, and the capacitor CRF and the resistor RL may be connected to be grounded at ground 413.

An AC waveform of power (e.g., a sinusoidal waveform of power) may be applied to the input terminal 401. In one embodiment, the AC power may be provided, from the receiving circuit (e.g., the coil 321 or power reception antenna 341) receiving the power, to the input terminal 401. Accordingly, positive power may be applied to the input terminal 401 during a first period and negative power may be applied to the input terminal 401 during a second period. Where positive power is applied to the input terminal 401, the first P-MOSFET MP1 may be controlled in an "on" state, and thus, the positive power may be provided through the first P-MOSFET MP1 to the output terminal 402. When negative power is applied to the input terminal 401, the first P-MOSFET MP1 may be controlled in an "off" state, and the first N-MOSFET MN1 may be controlled in the "on" state, so that the negative power may be provided to the ground 412, and not to the output terminal 402. Accordingly, only positive power may be provided to the output terminal 402 and as such, the AC power may be rectified. When positive power is applied to the input terminal 401, a forward loss may occur due to the threshold voltage of the first P-MOSFET MP1. Further, when negative power is applied to the input terminal 401, the first P-MOSFET MP1 should be fully opened. However, a failure to fully open the first P-MOSFET MP1 may cause a leakage current that passes in the reverse direction from the output terminal 402 through the first P-MOSFET MP1, resulting in a reverse leakage loss.

Referring to FIG. 4B, a view is provided illustrating a rectifying circuit according to an embodiment of the disclosure. As compared with that shown in FIG. 4A, the rectifying circuit of FIG. 4B may further include a forward loss compensating circuit 421 and a reverse loss compensating circuit 422 which are connected to the gate of the first P-MOSFET MP1. When positive power is applied to the input terminal 401, the forward loss compensating circuit 421 may lower the threshold voltage of the first P-MOSFET MP1, thus preventing a forward loss from occurring due to the threshold voltage of the first P-MOSFET MP1. For example, the forward loss compensating circuit 421 may perform control to connect the gate of the first P-MOSFET MP1 to the source of the first P-MOSFET MP1, thereby lowering the threshold voltage. In this case, the first P-MOSFET MP1 may be controlled in the "on" state also by the forward loss compensating circuit 421. When negative power is applied to the input terminal 401, the reverse loss compensating circuit 422 may control the first P-MOSFET MP1 in the "off" state. For example, the reverse loss compensating circuit 422 may perform control to connect the output terminal 402 to the first P-MOSFET MP1, thus allowing the first P-MOSFET MP1 to fully turn off. As the first P-MOSFET MP1 is controlled fully in the "off" state, a reverse leakage current may be prevented from flowing through the first P-MOSFET MP1. According to an embodiment of the disclosure, the forward loss compensating circuit 421 and the reverse loss compensating circuit 422 may prevent a forward loss and a reverse leakage loss without the need for control, thus allowing for avoidance of any loss without additional power consumption. It will be readily appreciated by one of ordinary skill in the art that the first P-MOSFET MP1 may be implemented as any type of switch that turns on during a first period to deliver positive power to the output terminal 402, and that turns off during a second period to stop delivering positive power to the output terminal 402. Although FIG. 4 illustrates an example in which the forward loss compensating circuit 421 and the reverse loss compensating circuit 422 are both connected to the first P-MOSFET MP1, the rectifying circuit according to an embodiment of the disclosure may include only one of the forward loss compensating circuit 421 or the reverse loss compensating circuit 422.

Figure 5:
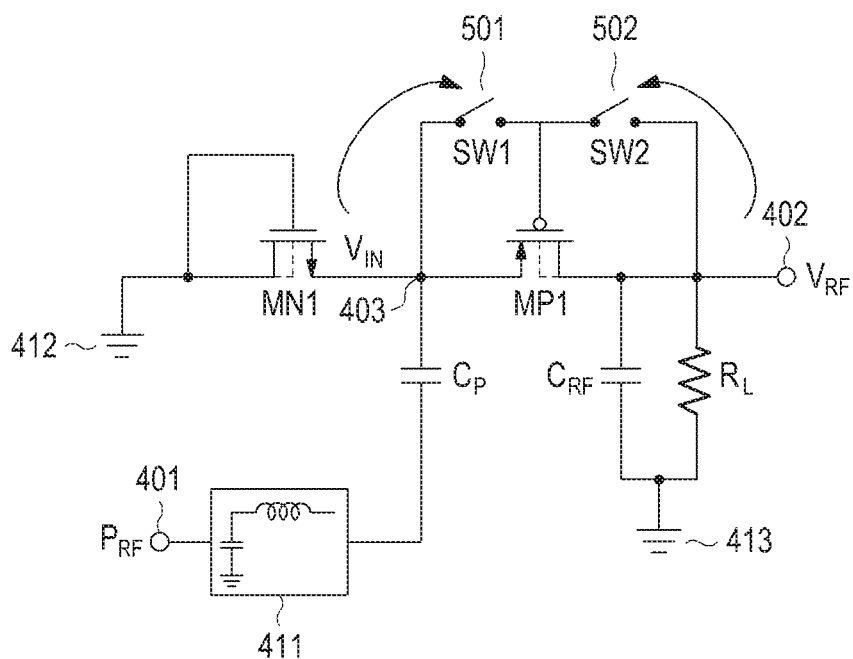
FIGS. 5, 6, 7, 8 and 9 are views illustrating rectifying circuits according to various embodiments of the disclosure.

FIG. 5 is a view illustrating a rectifying circuit according to an embodiment of the disclosure.

Referring to FIG. 5, as compared with that of FIG. 4A, the rectifying circuit of FIG. 5 may further include a first switch 501 and a second switch 502. For example, the forward loss compensating circuit 421 of FIG. 4B may be implemented as the first switch 501, and the reverse loss compensating circuit 422 of FIG. 4B may be implemented as the second switch 502. While positive power is applied to the input terminal 401, the first switch 501 may remain in the "on" state, and the second switch 502 may remain in the "off" state. As the first switch 501 is controlled in the "on" state, the gate of the first P-MOSFET MP1 is connected to the node 403, allowing the gate to connect to the input terminal 401. Further, as the second switch 502 is controlled in the "off" state, a voltage VINN, which is applied to the node 403 and is lower than the voltage VRF at the output terminal 402, may be applied to the gate of the first P-MOSFET MP1, allowing the first P-MOSFET MP1 to be controlled in the "on" state. Since the gate of the first P-MOSFET MP1 may be connected to the source of the first P-MOSFET MP1, the threshold voltage of the first P-MOSFET MP1 may also be lowered. As the threshold voltage reduces, the forward loss due to the threshold voltage of the first P-MOSFET MP1 may decrease. If the gate of the first P-MOSFET MP1 is left at a relatively low voltage (e.g., VINN) given for compensating for only positive power, the reverse leakage loss may increase. According to an embodiment of the disclosure, the rectifying circuit may include the second switch 502 for compensation where negative power is applied to the input terminal 401. When negative power is applied to the input terminal 401, the first switch 501 may turn off, and the second switch 502 may turn on. Thus, the gate of the first P-MOSFET MP1 may be connected to the output terminal 402, and a relatively high voltage, VRF, may be applied to the gate, and the first P-MOSFET MP1 may be turned off. The VRF may be, e.g., a designated value or more, thus ensuring that the first P-MOSFET MP1 turns off. As the first P-MOSFET MP1 turns off, a leakage current that flows from the output terminal 402 through the first P-MOSFET MP1 in the reverse direction may reduce. Thus, the reverse leakage loss may decrease.

Figure 6:
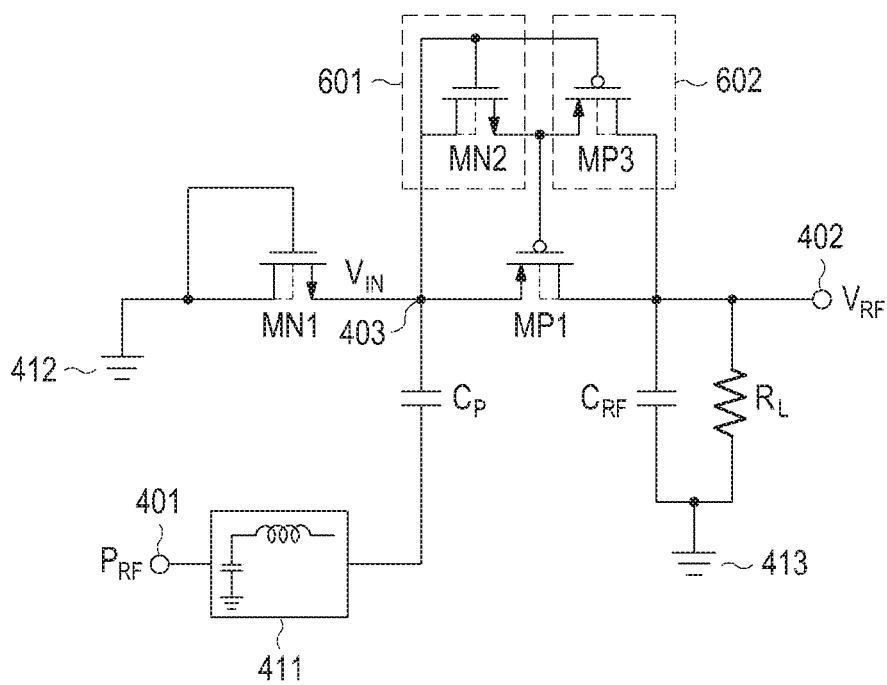

FIG. 6 is a view illustrating a rectifying circuit according to an embodiment of the disclosure.

Referring to FIG. 6, as compared with that of FIG. 4A, the rectifying circuit of FIG. 6 may further include a first switch 601 and a second switch 602. The first switch 601 may be implemented as a second N-MOSFET MN2, and the second switch 602 may be implemented as a third P-MOSFET MP3. The gate of the second N-MOSFET MN2 may be connected to the node 403 and thus the input terminal 401. The second N-MOSFET MN2 may be connected to the drain of the second N-MOSFET MN2. The source of the second N-MOSFET MN2 may be connected to the gate of the first P-MOSFET MP1. The source of the second N-MOSFET MN2 may be connected to the source of the third P-MOSFET MP3. The source of the third P-MOSFET MP3 may be connected to the gate of the first P-MOSFET MP1. The gate of the third P-MOSFET MP3 may be connected to the gate of the second N-MOSFET MN2 and the node 403. The drain of the third P-MOSFET MP3 may be connected to the drain of the first P-MOSFET MP1 and the output terminal 402. While positive power is applied to the input terminal 401, the second N-MOSFET MN2 may turn on, and the third P-MOSFET MP3 may turn off. As the second N-MOSFET MN2 is controlled in the "on" state, the gate of the first P-MOSFET MP1 may be connected to the node 403. Further, as the third P-MOSFET MP3 is controlled in the "off" state, a voltage VINN, which is applied to the node 403 and is lower than the voltage VRF at the output terminal 402, may be applied to the gate of the first P-MOSFET MP1, allowing the first P-MOSFET MP1 to be controlled in the "on" state. While negative power is applied to the input terminal 401, the second N-MOSFET MN2 may turn off, and the third P-MOSFET MP3 may turn on. Thus, the gate of the first P-MOSFET MP1 may be connected to the output terminal 402, and a relatively high voltage (e.g., a value not less than a designated value), VRF, may be applied to the gate, and the first P-MOSFET MP1 may be turned off. As the first P-MOSFET MP1 turns off, a leakage current that flows from the output terminal 402 through the first P-MOSFET MP1 in the reverse direction may reduce. Thus, the reverse leakage loss may decrease. As set forth above, according to an embodiment of the disclosure, the second N-MOSFET MN2 and the third P-MOSFET MP3 may be operated merely by the power received through the input terminal 401, and without the need for other control signals. Thus, no additional power consumption is required to reduce loss.

Figure 7:
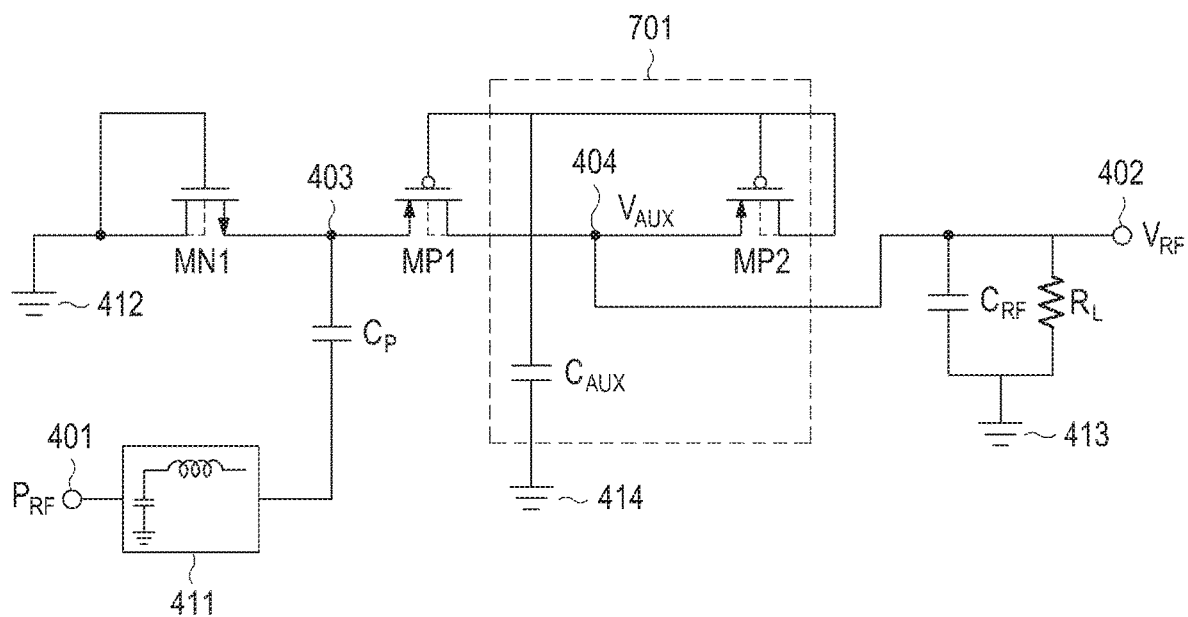

FIG. 7 is a view illustrating a rectifying circuit according to an embodiment of the disclosure.

Referring to FIG. 7, as compared with that of FIG. 4A, the rectifying circuit of FIG. 7 may further include a forward loss compensating circuit 701. According to an embodiment of the disclosure, the forward loss compensating circuit 701 may include a second P-MOSFET MP2 and a capacitor CAUX. The display of the first P-MOSFET MP1 may be connected to a node 404, and the node 404 may be connected to the source of the second P-MOSFET MP2. The node 404 may be connected to the output terminal 402. The drain of the second P-MOSFET MP2 may be connected to the gate of the second P-MOSFET MP2, and the gate of the second P-MOSFET MP2, along with the gate of the first P-MOSFET MP1, may be connected to one end of the capacitor CAUX. The other end of the capacitor CAUX may be connected to a ground 414. In the circuit connections of FIG. 7, the voltage VRF at the output terminal may be 1/2(VINN+Vthp1−Vthp2+VAUX), where Vthp1 may be the threshold voltage of the first P-MOSFET MP1, and Vthp2 may be the threshold voltage of the second P-MOSFET MP2. As evident from the above equation, the threshold voltage Vthp1 of the first P-MOSFET MP1 and the threshold voltage Vthp2 of the second P-MOSFET MP2 may cancel each other. Thus, when positive power is applied to the input terminal 401, the threshold voltage may reduce. While positive power is applied to the input terminal 401, the second P-MOSFET MP2 may be in the "on" state. As the threshold voltage reduces, the forward loss may decrease while positive power is applied.

Figure 8:
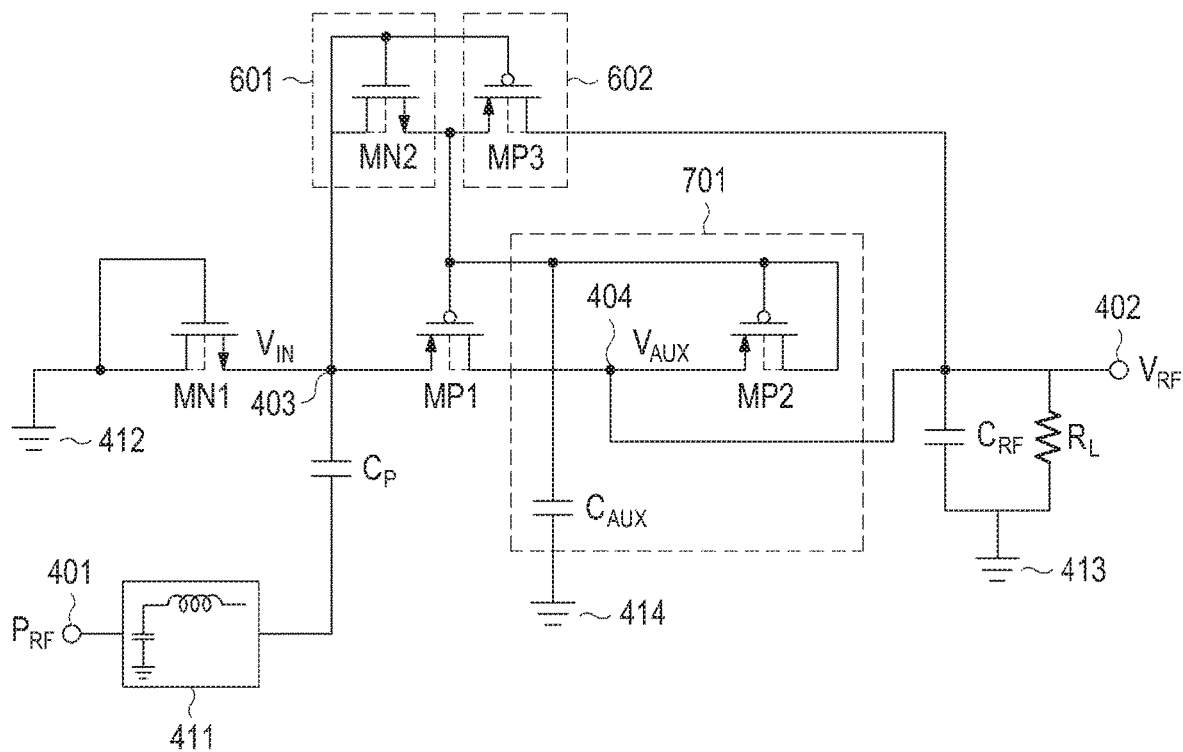

FIG. 8 is a view illustrating a rectifying circuit according to an embodiment of the disclosure.

Referring to FIG. 8, as compared with that of FIG. 7, the rectifying circuit of FIG. 8 may further include the first switch 601 and the second switch 602. The first switch 601 may be implemented as a second N-MOSFET MN2, and the second switch 602 may be implemented as a third P-MOSFET MP3. As set forth above in connection with FIG. 6, while positive power is applied to the input terminal 401, the second N-MOSFET MN2 may turn on, and the third P-MOSFET MP3 may turn off. As the second N-MOSFET MN2 is controlled in the "on" state, the gate of the first P-MOSFET MP1 may be connected to the node 403. Further, as the third P-MOSFET MP3 is controlled in the "off" state, a voltage VINN, which is applied to the node 403 and is lower than the voltage VRF at the output terminal 402, may be applied to the gate of the first P-MOSFET MP1, allowing the first P-MOSFET MP1 to be controlled in the "on" state. While negative power is applied to the input terminal 401, the second N-MOSFET MN2 may turn off, and the third P-MOSFET MP3 may turn on. Thus, the gate of the first P-MOSFET MP1 may be connected to the output terminal 402, and the voltage VRF may be applied to the gate, and the first P-MOSFET MP1 may be turned off. As the first P-MOSFET MP1 turns off, a leakage current that flows from the output terminal 402 through the first P-MOSFET MP1 in the reverse direction may reduce. As such, as the threshold voltage reduces, the forward loss and the reverse leakage loss both may decrease.

For example, during positive cycles, the first P-MOSFET MP1 and the second P-MOSFET MP2 may be forward-biased. In this case, the threshold voltages of the first P-MOSFET MP1 and the second P-MOSFET MP2 may reduce, and such reduction in threshold voltage may be attributed to the connection of the drain of the second P-MOSFET MP2 via the second N-MOSFET MN2 to the node 403. In this case, the source-gate voltage, $V_{SGP3}$, of the third P-MOSFET MP3 may be less than the threshold voltage, and the third P-MOSFET MP3 may remain in the "off" state. During negative cycles, the first P-MOSFET MP1 and the second P-MOSFET MP2 may be reverse-biased. In this case, $V_{SGP3}$ may remain in the "on" state, and the source-gate voltage, $V_{SGP1}$, of the first P-MOSFET MP1 and the source-gate voltage, $V_{SGP2}$, of the second P-MOSFET MP2 may reduce to zero. Thus, as the source of the second P-MOSFET MP2 connects to the output terminal 402, the reverse leakage loss may reduce.

During positive cycles, the voltage $V_0$ at the output terminal 402 increases, so that $V_{SGP2}$ may be subject to a steady increase that may result from the connection of the source of the second P-MOSFET MP2 to the output terminal 402. Where $V_{SGP2}$ becomes equal to the threshold voltage ($|V_{THP1}|$) of the first P-MOSFET MP1, the second P-MOSFET MP2 may lead the first P-MOSFET MP1 to a convergent area. During negative cycles, the capacitor $C_{AUX}$ may partially preserve against the charge loss during the reverse conduction in the rectifier. Equations 1 to 3 represent the voltage $V_0$ at the output terminal 402 with $V_{INN}$, $V_{SDP1}$, $V_{SDP2}$, and $V_{AUX}$. $V_{INN}$ is the voltage at the node 403, $V_{SDP1}$ is the source-drain voltage of the first P-MOSFET MP1, e.g., a voltage drop at the first P-MOSFET MP1, $V_{SDP2}$ may be the source-drain voltage of the second P-MOSFET MP2, e.g., a voltage drop at the second P-MOSFET MP2, and $V_{AUX}$ may be the gate voltage of the second P-MOSFET MP2.

$$V_0 = V_{INN} - V_{SDP1} \quad \text{Equation 1}$$

$$V_0 = V_{SDP2} + V_{AUX} \quad \text{Equation 2}$$

$$V_0 = 1/2(V_{INN} - V_{SDP1} + V_{SDP2} + V_{AUX}) \quad \text{Equation 3}$$

Where the first P-MOSFET MP1 and the second P-MOSFET MP2 enter into the convergent area, $V_{SDP1}$ and $V_{SDP2}$ may be the threshold voltages of the first P-MOSFET MP1 and the second P-MOSFET MP2. Since the voltage $V_0$ at the output terminal 402 may likewise be represented as in Equations 1 to 3, Equations 4 to 6 may be derived.

$$V_{INN} = V_{GP1} + V_{AUX} \quad \text{Equation 4}$$

$$V_0 = -V_{SDP1} + V_{SGP1} + V_{AUX} \quad \text{Equation 5}$$

$$V_0 = V_{SGP2} + V_{AUX} \quad \text{Equation 6}$$

Equation 7 may be derived by subtracting Equation 5 from Equation 6.

$$V_{SDP1} = V_{SGP1} - V_{SGP2} \quad \text{Equation 7}$$

It can be verified from Equation 6 that $V_{SGP2}$ increases in proportion to $V_0$. Where $V_{SGP2}$ becomes the threshold voltage, the first P-MOSFET MP1 may enter the convergent area. From Equations 3 to 7, $V_0$ may be derived as shown in Equations 8 and 9.

$$V_0 = 1/2(V_{INN} - V_{SG1} + |V_{THP1}| + V_{SG2} - |V_{THP2}| + V_{AUX}) \quad \text{Equation 8}$$

In Equation 8, $V_{SG1}$ and $V_{SG2}$ may approximate the threshold voltage. $|V_{THP2}|$ may be the threshold voltage of the first P-MOSFET MP1.

$$1/2(V_{INN} + |V_{THP1}| - V_{THP2}| + V_{AUX}) \quad \text{Equation 9}$$

As set forth above, the influence of the threshold voltage on the DC output voltage may reduce.

Figure 9:
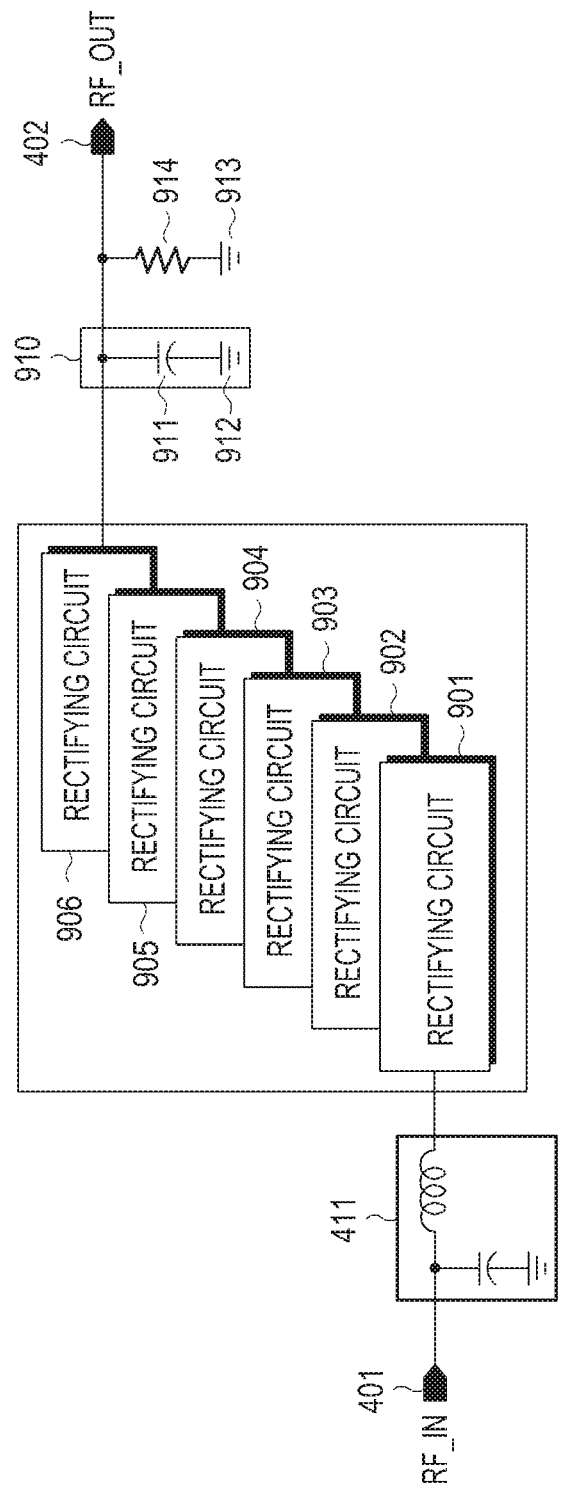

FIG. 9 is a view illustrating a rectifying circuit according to an embodiment of the disclosure.

Referring to FIG. 9, the input terminal 401 may be connected to a plurality of rectifying circuits 901, 902, 903, 904, 905 and 906. The plurality of rectifying circuits 901 to 906 each may be configured as a unit cell. A matching circuit 411 may be connected between the input terminal 401 and the plurality of rectifying circuits 901 to 906. The plurality of rectifying circuits 901 to 906 may be connected in parallel with each other, but embodiments are not limited thereto. AC power from the input terminal 401 may be distributed to the plurality of rectifying circuits 901 to 906 and rectified by the plurality of rectifying circuits 901 to 906, outputting rectified DC power. Where a power of 3 W is input from the input terminal 401, each of the six rectifying circuits 901 to 906 may rectify and output a power of 0.5 W. Thus, one rectifying circuit may be implemented to include devices (e.g., MOSFETs) for processing relatively low levels of power, thereby allowing the processing efficiency to increase. Each of the plurality of rectifying circuits 901 to 906 may be the rectifying circuit of any one of FIG. 4A, 4B, 5, 6, 7 or 8. A DC combiner 910 may combine power signals received from the plurality of rectifying circuits 901 to 906 into a DC power signal and output a DC power signal to the output terminal 402. The DC combiner 910 may include a filter, e.g., a ground 912 and a capacitor 911, and be able to combine electric charges. An additional filter component including a ground 913 and a resistor 914 can also be provided.

Figure 10:
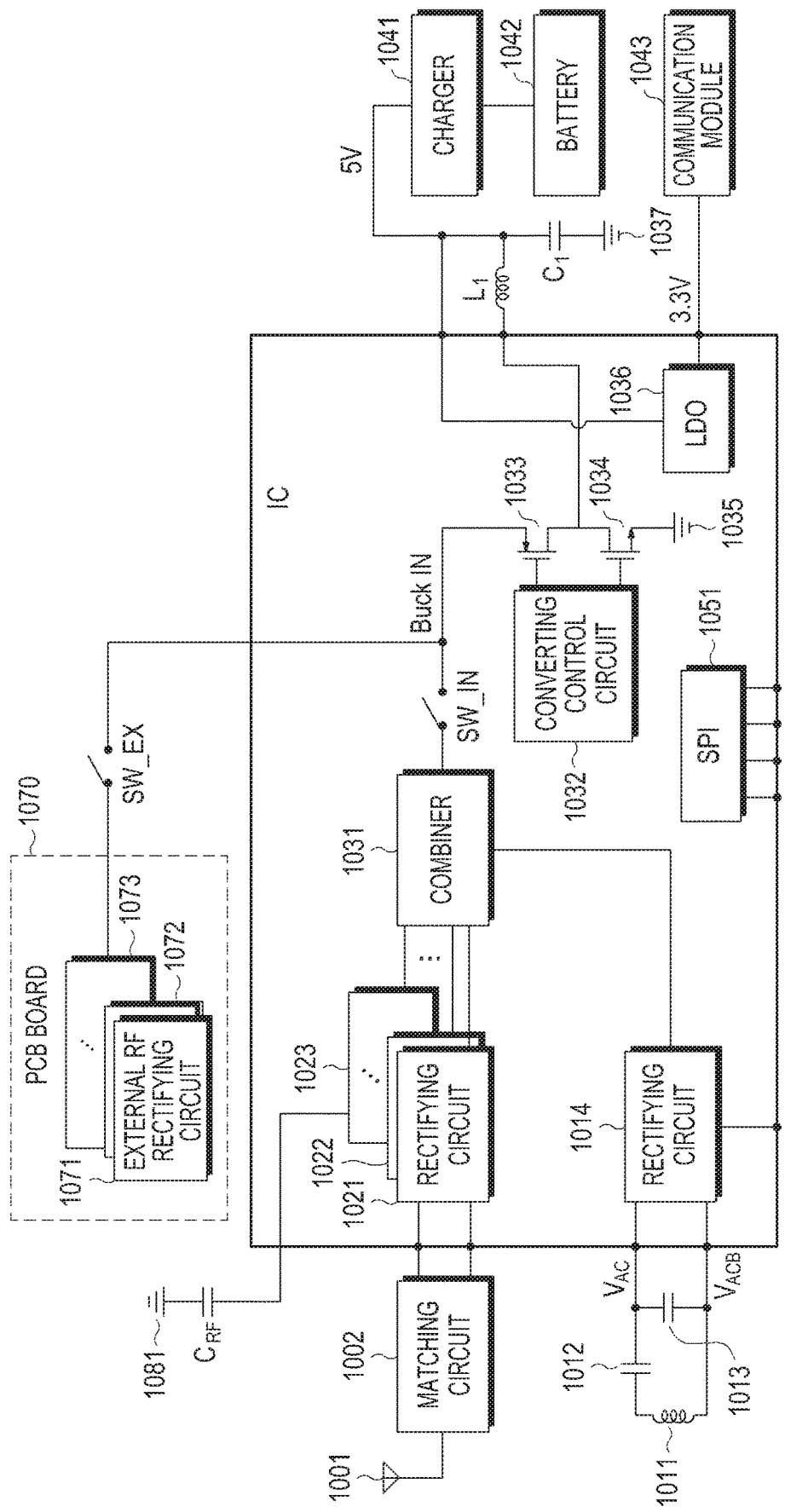
FIG. 10 is a block diagram illustrating an electronic device according to an embodiment of the disclosure.

FIG. 10 is a block diagram illustrating an electronic device according to an embodiment of the disclosure.

Referring to FIG. 10, the electronic device 150 may include a power reception antenna 1001, a matching circuit 1002, a power reception coil 1011, capacitors 1012 and 1013, a rectifying circuit 1014, a plurality of rectifying circuits 1021, 1022, and 1023, a combiner 1031, a switch SW_IN, a converting control circuit 1032, transistors 1033 and 1034, a linear drop-out (LDO) regulator 1036, a charger 1041, a battery 1042, a communication module 1043, an inductor L1, a capacitor C1, a serial peripheral interface (SPI) 1051, a power circuit board (PCB) 1070, a switch SW_EX, and a capacitor CRF.

The power reception antenna 1001 may output AC power using RF waves. The matching circuit 1002 may include at least one of an inductor or capacitor connected to the power reception antenna 1001 to thereby change the impedance (or load) connected to the power reception antenna 1001. The plurality of rectifying circuits 1021, 1022, and 1023 may distributively receive AC power from the power reception antenna 1001 and rectify the AC power. Each of the plurality of rectifying circuits 1021, 1022, and 1023 may be the rectifying circuit of any one or more of FIG. 4A, 4B, 5, 6, 7, or 8. The combiner 1031 may receive power from the rectifying circuits to perform rectification among the plurality of rectifying circuits 1021, 1022, and 1023 while disconnecting the other non-selected rectifying circuits from the electrical connection. The capacitor CRF may be connected between the plurality of rectifying circuits 1021, 1022, and 1023, and ground 1081. The combiner 1031 may combine rectified power signals received from at least one of the plurality of rectifying circuits 1021, 1022, and 1023.

The switch SW_IN may turn on upon determining that the power reception antenna 1001 receives power. Upon determining that another power reception antenna (not shown) receives power, the switch SW_IN may be controlled to turn off. The AC power from the other power reception antenna (not shown) may be rectified through a plurality of external RF rectifying circuits 1071, 1072, and 1073 included in the PCB 1070. In this case, the switch SW_EX may be controlled to turn on. For example, the control circuit may control the On/Off of the switch SW_IN or the switch SW_EX through the SPI 1051. The coil 1011 and the capacitors 1012 and 1013 may form a resonance circuit to receive, e.g., a power of 6.78 MHz. Thus, a VAC and a VACB may be applied to both ends of the resonance circuit. The power received by the resonance circuit may be rectified by the rectifying circuit 1014 and provided to the combiner 1031. A voltage Buck-In may be applied to the output terminal of the combiner 1031. The converting control circuit 1032 may control the On/Off of the transistors 1033 and 1034, and thus, the input voltage may be converted (e.g., Buck-converted) and outputted. The source of the transistor 1034 may be connected to ground 1035. By the converting, a voltage of, e.g., 5V may be provided to the charger 1041. The transistors 1033 and 1034 may be connected to the inductor L1 and the capacitor C1, one end thereof being grounded at ground 1037 and one end thereof connected to the charger 1041 to provide a voltage of 5V. The charger 1041 may charge the battery 1042. The LDO regulator 1036 may be connected to the inductor L1 and may convert a voltage of, e.g., 5V into 3.3V and provide the 3.3V voltage to the communication module 1043.

Figure 11:
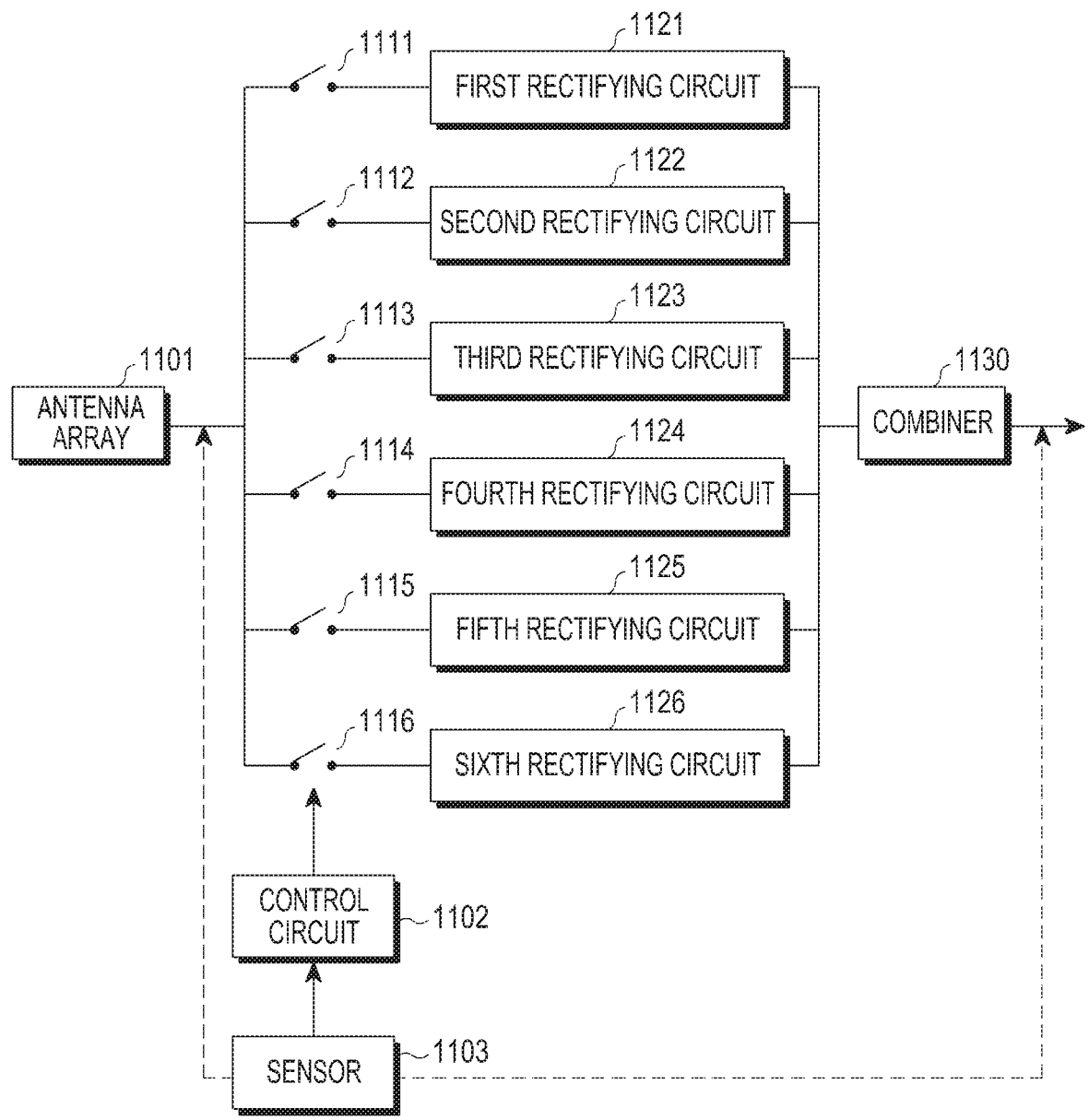
FIG. 11 is a block diagram illustrating an electronic device according to an embodiment of the disclosure.

FIG. 11 is a block diagram illustrating an electronic device according to an embodiment of the disclosure.

Referring to FIG. 11, the electronic device 150 may include an antenna array 1101, a control circuit 1102, a sensor 1103, a plurality of switches 1111, 1112, 1113, 1114, 1115 and 1116, a plurality of rectifying circuits 1121, 1122, 1123, 1124, 1125 and 1126, and a combiner 1130. Each of the plurality of rectifying circuits 1121 to 1126 may be the rectifying circuit of any one or more of FIG. 4A, 4B, 5, 6, 7, or 8. The antenna array 1101 may receive an RF wave and output AC power. The sensor 1103 may detect an electrical characteristic that indicates the magnitude of the RF wave received from the antenna array 1101. For example, the sensor 1103 may sense the magnitude of at least one of the current, voltage, or power at the output terminal of the antenna array 1101. Alternatively, the sensor 1103 may sense the magnitude of at least one of the current, voltage, or power at the output terminal of the combiner 1130. The control circuit 1102 may receive a result of the sensing and determine the number of rectifying circuits to perform rectification based on the sensing result. For example, the control circuit 1102 may refer to information about the correlation between the switch control signal and the magnitude of power received as set forth in Table 1.

TABLE 1

| Magnitude (V) of power received | Switch control signal | | | | | |
|---|---|---|---|---|---|---|
| | First switch 1111 | Second switch 1112 | Third switch 1113 | Fourth switch 1114 | Fifth switch 1115 | Sixth switch 1116 |
| a or less | ON | OFF | OFF | OFF | OFF | OFF |
| more than a and not more than b | ON | ON | OFF | OFF | OFF | OFF |
| more than b and not more than c | ON | ON | ON | OFF | OFF | OFF |
| more than d and not more than e | ON | ON | ON | ON | OFF | OFF |
| more than e and not more than f | ON | ON | ON | ON | ON | OFF |
| more than f | ON | ON | ON | ON | ON | ON |

Although the magnitude V of power received in Table 1 may be the voltage at the output terminal of the antenna array 1101 as shown in FIG. 11, it is not particularly limited as long as it is an electrical characteristic at the point where the magnitude of power received may be represented as set forth above. For example, upon determining that the voltage corresponding to the magnitude of power received falls within a range from "b" to "c", the control circuit 1102 may control the switches 1111 to 1116 to enable three rectifying circuits (e.g., 1121, 1122, and 1123) to perform rectification. Thus, an optimal number of rectifying circuits may perform rectification depending on the magnitude of power received, leading to an enhancement in processing efficiency. For example, the switches 1111 to 1116 each may be implemented as a field effect transistor (FET). In this case, the control circuit 1102 may control the voltage applied to the respective gates of the switches 1111 to 1116 based on a result of determination on a rectifying circuit to be driven, thereby enabling the On/Off control of the switches 1111 to 1116. The switches 1111 to 1116 are not limited as implemented in a particular manner shown or described. It will readily be appreciated by one of ordinary skill in the art that the control circuit 1102 may control the On/Off of each switch 1111 to 1116 depending on the implementations of the switches 1111 to 1116.

Figure 12:
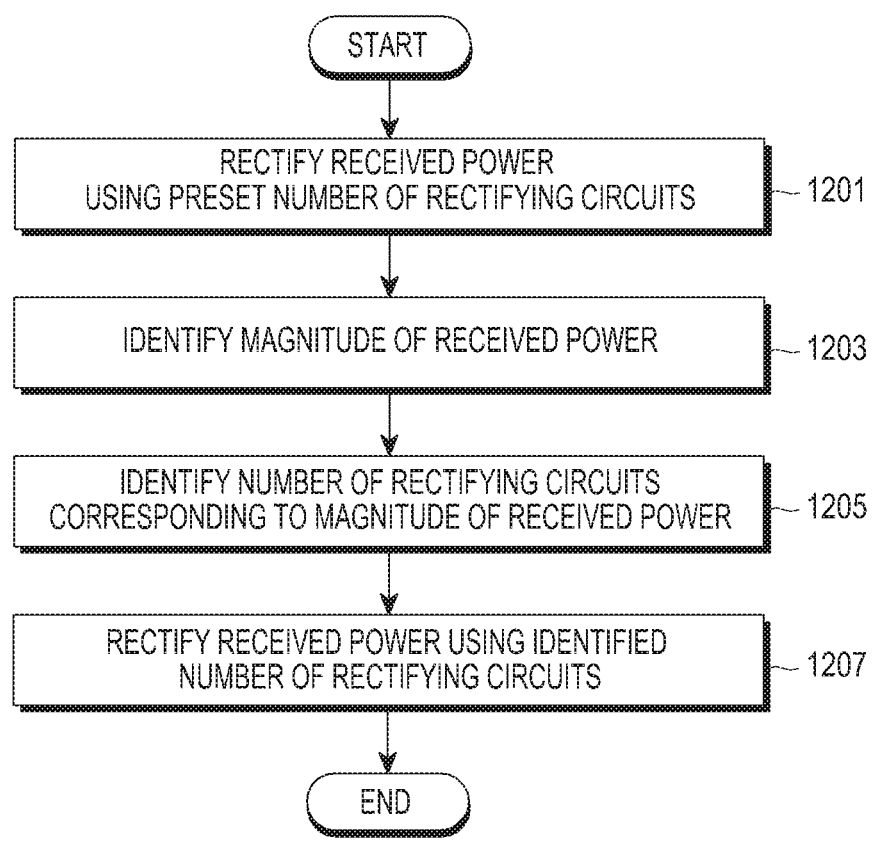
FIG. 12 is a flowchart illustrating a method for operating an electronic device according to an embodiment of the disclosure.

FIG. 12 is a flowchart illustrating a method for operating an electronic device according to an embodiment of the disclosure.

Referring to FIG. 12, in operation 1201 the electronic device 150 may rectify received power using a preset number of rectifying circuits. For example, the electronic device 150 may perform rectification using all of the plurality of rectifying circuits 1121 to 1126 of FIG. 11. The number of rectifying circuits to perform the first rectification may be set as a default value which may differ depending on implementations. In operation 1203, the electronic device 150 may identify the magnitude of the received power. For example, the electronic device 150 may identify the magnitude of power by measuring the magnitude of voltage, current, or power at the output terminal of the antenna array or coil, or by measuring the magnitude of voltage, current, or power at the output terminal of the combiner. In operation 1205, the electronic device 150 may identify the number of rectifying circuits corresponding to the magnitude of power received. For example, the electronic device 150 may determine the On/Off of the switch connected to each rectifying circuit or identify the number of rectifying circuits based on the correlation information set forth in Table 1. In operation 1207, the electronic device 150 may perform control to rectify the received power using the identified number of rectifying circuits while preventing the remaining rectifying circuits from performing rectification.

Figure 13:
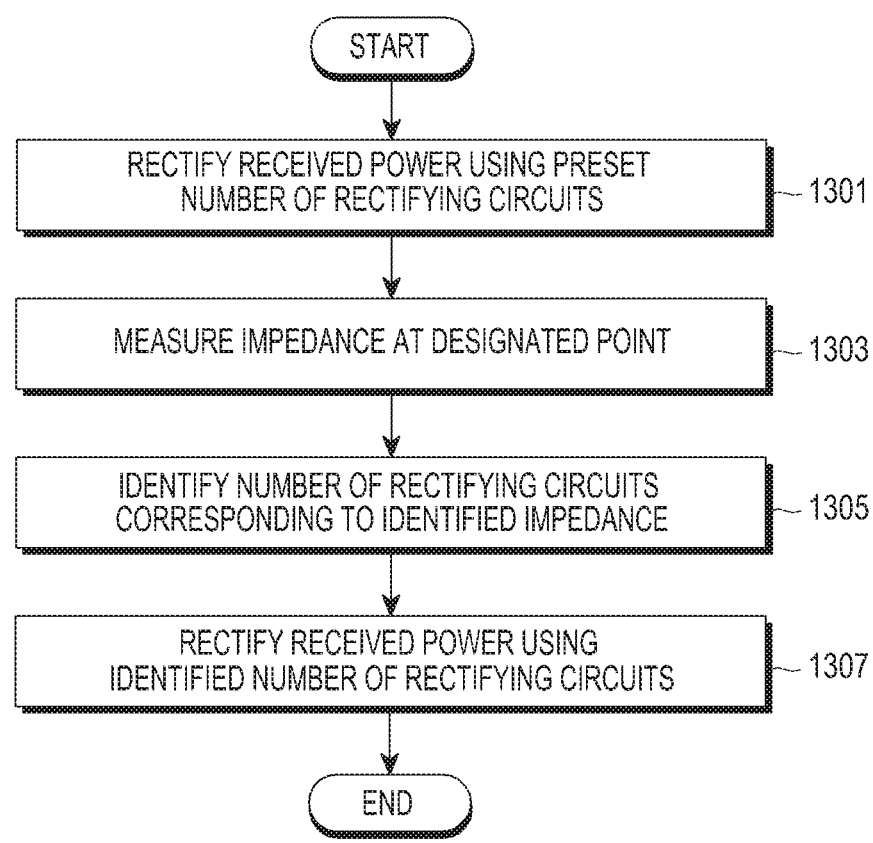
FIG. 13 is a flowchart illustrating a method for operating an electronic device according to an embodiment of the disclosure.

FIG. 13 is a flowchart illustrating a method for operating an electronic device according to an embodiment of the disclosure.

Referring to FIG. 13, in operation 1301 the electronic device 150 may rectify received power using a preset number of rectifying circuits. As set forth above in connection with FIG. 12, the number of rectifying circuits to perform the first rectification may be set as a default value. In operation 1303, the electronic device 150 may measure the impedance at a designated point. For example, the electronic device 150 may measure the impedance in the coil, antenna array, battery, or at other various points, but without being limited to a particular point where the impedance measurement is performed. In operation 1305, the electronic device 150 may identify the number of rectifying circuits corresponding to the measured impedance. For example, the electronic device 150 may store correlation information as set forth in Table 2.

TABLE 2

| Impedance measurements (ohm) | Switch control signal | | | | | |
|---|---|---|---|---|---|---|
| | First switch 1111 | Second switch 1112 | Third switch 1113 | Fourth switch 1114 | Fifth switch 1115 | Sixth switch 1116 |
| not more than g | ON | OFF | OFF | OFF | OFF | OFF |
| more than g and not more than h | ON | ON | OFF | OFF | OFF | OFF |
| more than h and not more than i | ON | ON | ON | OFF | OFF | OFF |
| more than i and not more than j | ON | ON | ON | ON | OFF | OFF |
| more than j and not more than k | ON | ON | ON | ON | ON | OFF |
| more than k | ON | ON | ON | ON | ON | ON |

The impedance measurements (ohm) set forth in Table 2 may be, e.g., impedance measured in the antenna 1001, coil 1011, or battery 1042 of FIG. 10, but where the impedance is measured is not limited thereto. For example, upon determining that the voltage corresponding to the magnitude of power received falls within a range from "g" to "h", the control circuit 1102 may control the switches 1111 to 1116 to enable two rectifying circuits (e.g., 1121 and 1122) to perform rectification. Thus, an optimal number of rectifying circuits may perform rectification depending on the magnitude of power received, leading to an enhancement in processing efficiency. Further, according to an embodiment of the disclosure, the electronic device 150 may also determine a rectifier(s), or a number of rectifiers, to perform rectification using both the magnitude of power received and the impedance at a designated point.

Figure 14:
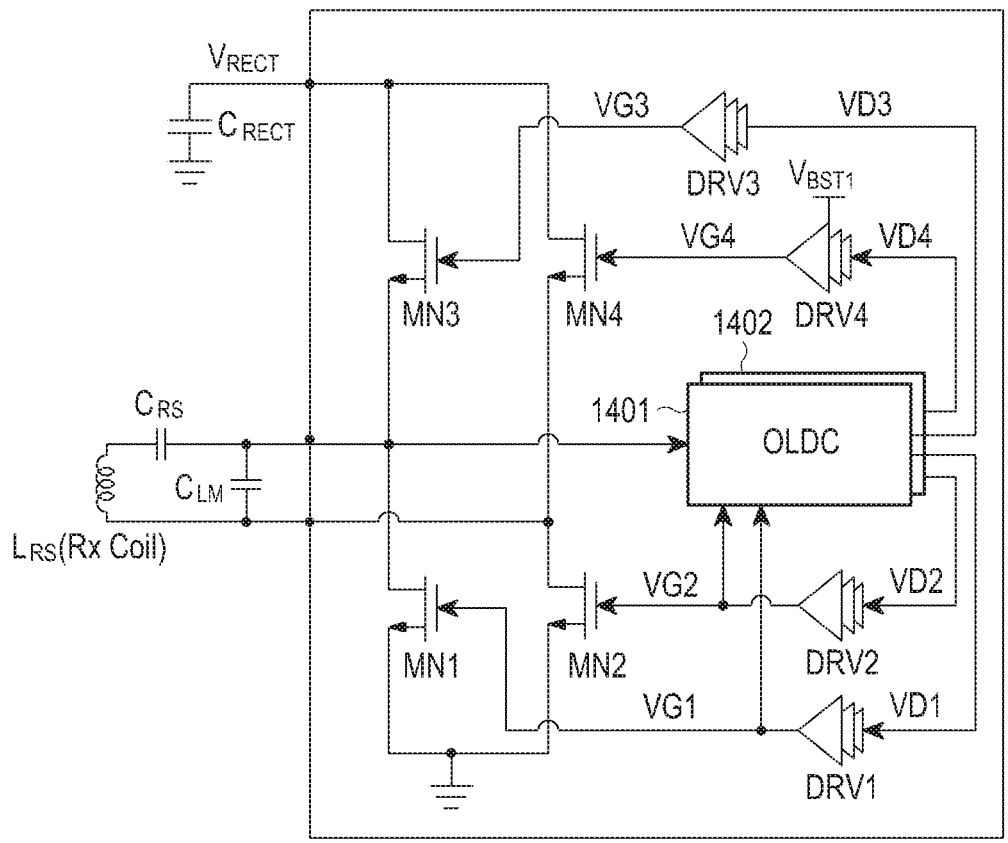
FIG. 14 is a circuit diagram illustrating a resonance circuit and a rectifying circuit according to an embodiment of the disclosure.

FIG. 14 is a circuit diagram illustrating a resonance circuit and a rectifying circuit according to an embodiment of the disclosure.

Referring to FIG. 14, the circuit diagram illustrates examples of the power reception coil 1011, the capacitors 1012 and 1013, and the rectifying circuit 1014 to receive power by way of a resonance scheme as described above in connection with FIG. 10. The power reception coil $L_{RS}$, along with a capacitor $C_{RS}$ and a capacitor $C_{LM}$, may form a resonance circuit. AC power received through the resonance circuit may be rectified by a full-bridge diode rectifier. The full-bridge diode rectifier may rectify, e.g., AC voltage ($V_{AC}$ and $V_{ACB}$) into a DC voltage, $V_{RECT}$. The rectified voltage $V_{RECT}$ may be connected to the rectifying capacitor $C_{RECT}$. Although not shown, the rectified voltage $V_{RECT}$ may also be connected to other various circuits and elements along paths different from the path along which it connects to the rectifying capacitor $C_{RECT}$. The rectifying capacitor $C_{RECT}$ may be grounded. Thus, AC components remaining after the rectification may be applied to the ground via the rectifying capacitor $C_{RECT}$, thus allowing only DC components to be delivered to its downstream circuits.

For example, the full-bridge diode rectifier may include four MOSFTETs MN1, MN2, MN3, and MN4. Among the four MOSTFETs MN1, MN2, MN3, and MN4, the MOSFET MN1 and the MOSFET MN2 may be low-side devices, and the MOSFET MN3 and the MOSFET MN4 may be high-side devices. For example, during a first period, the MOSFET MN1 and the MOSFET MN2 may turn on while the MOSFET MN3 and the MOSFET MN4 turn off. During a second period subsequent to the first period, the MOSFET MN3 and the MOSFET MN4 may turn on while the MOSFET MN1 and the MOSFET MN2 turn off. AC power may be rectified into DC power by the operation of the full-bridge diode rectifier. The On/Off of the MOSFETs MN1, MN2, MN3, and MN4 may be controlled by gate voltages VD1, VD2, VD3, and VD4 applied to their respective gates. A first open loop delay compensation (OLDC) circuit 1401 may output the first driving voltage VD1 and the third driving voltage VD3. A first driver DRV1 and a third driver DRV3, respectively, may produce a first gate voltage VG1 and a third gate voltage VG3 from the first driving voltage VD1 and the third driving voltage VD3 and respectively transfer the produced first gate voltage VG1 and third gate voltage VG3 to the gate of the first MOSFET MN1 and the gate of the third MOSFET MN3. A second OLDC circuit 1402 may output the second driving voltage VD2 and the fourth driving voltage VD4. A second driver DRV2 and a fourth driver DRV4, respectively, may produce a second gate voltage VG2 and as fourth gate voltage VG4 from the second driving voltage VD2 and the fourth driving voltage VD4 and respectively transfer the produced second gate voltage VG2 and fourth gate voltage VG4 to the gate of the second MOSFET MN1 and the gate of the fourth MOSFET MN4. According to an embodiment of the disclosure, the first OLDC circuit 1401 may adjust the phase of the first driving voltage VD1 and the third driving voltage VD3 outputted using the first gate voltage VG1, and the second OLDC circuit 1402 may adjust the phase of the second driving voltage VD2 and the fourth driving voltage VD4 outputted using the second gate voltage VG2. The phase adjustment by the OLDC circuits 1401 and 1402 is described below in greater detail.

For example, where the resonance circuit receives power with a resonance frequency of 6.78 MHz, the 6.78 MHz frequency is relatively high. In this case, the parasitic capacitance and its resultant internal circuit delay may deteriorate the efficiency of the rectifying circuit. For example, a delay occurring in the driver DRV1 to DRV4 may cause a delay in the gate voltage VG1 to VG4. Thus, a difference may arise between the point when the voltage (e.g., $V_{AC}$) of power received passes zero (also referred to as a zero-crossing point) and the on/off time of the MOSFET MN1 to MN4, i.e., the rising edge or falling edge of the gate voltage VG1 to VG4. This difference may result in a reverse leakage current in the MOSFET, deteriorating the overall efficiency of the rectifying circuit.

According to an embodiment of the disclosure, the OLDC circuits 1401 and 1402, respectively, may receive the gate voltage VG1 and VG2 from the first driver DRV1 and the second driver DRV2 and adjust the phase of the driving voltage outputs VD1 to VD4 using the gate voltages. This may compensate for a delay that would occur in the drivers DRV1 to DRV4. For example, each OLDC circuit 1401 and 1402 may allow the falling edge of the voltage (e.g., VG1) of the driver to be consistent with the zero-crossing point of the AC power (e.g., VAC) received by the MOSFET (e.g., MOSFET MN1). Thus, the MOSFET MN1 may turn off at the exact zero-crossing point (e.g., the point when AC power (e.g., VAC) switches from a negative voltage to a positive voltage or from a positive voltage to a negative voltage).

Figure 15:
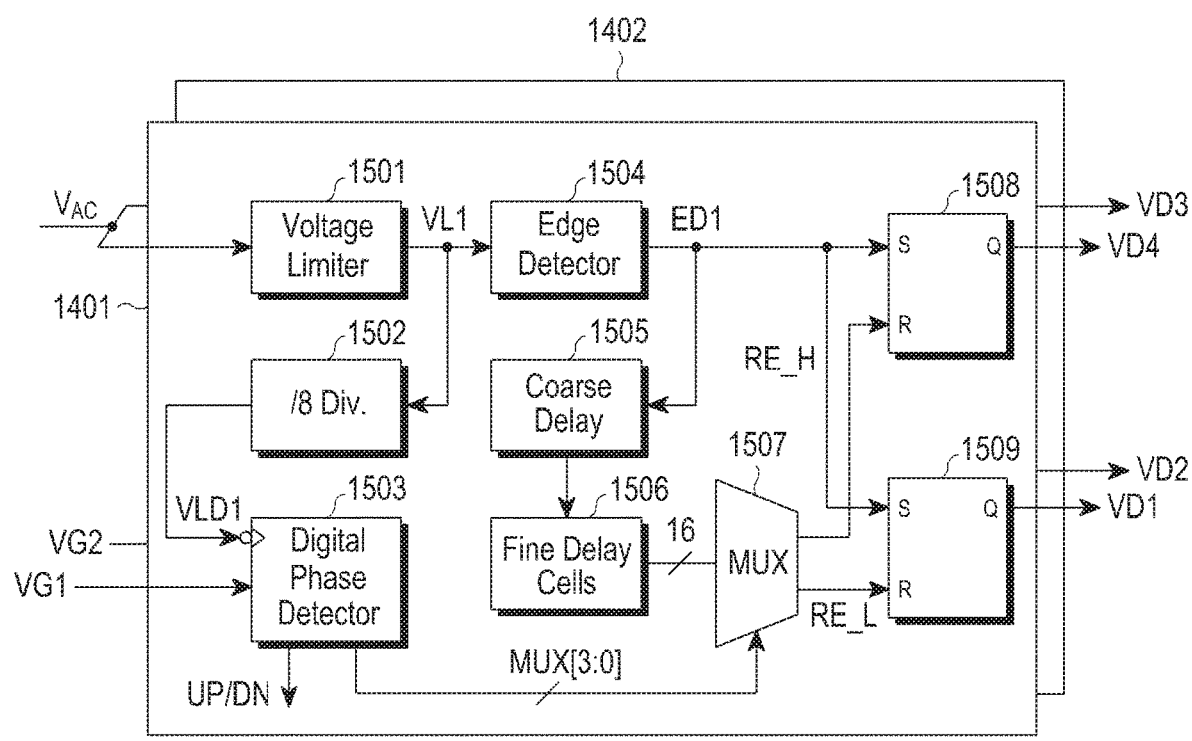
FIG. 15 is a block diagram illustrating an OLDC circuit according to an embodiment of the disclosure.

FIG. 15 is a block diagram illustrating an OLDC circuit according to an embodiment of the disclosure. An embodiment is described in detail with reference to FIG. 15 along with FIG. 16.

Figure 16:
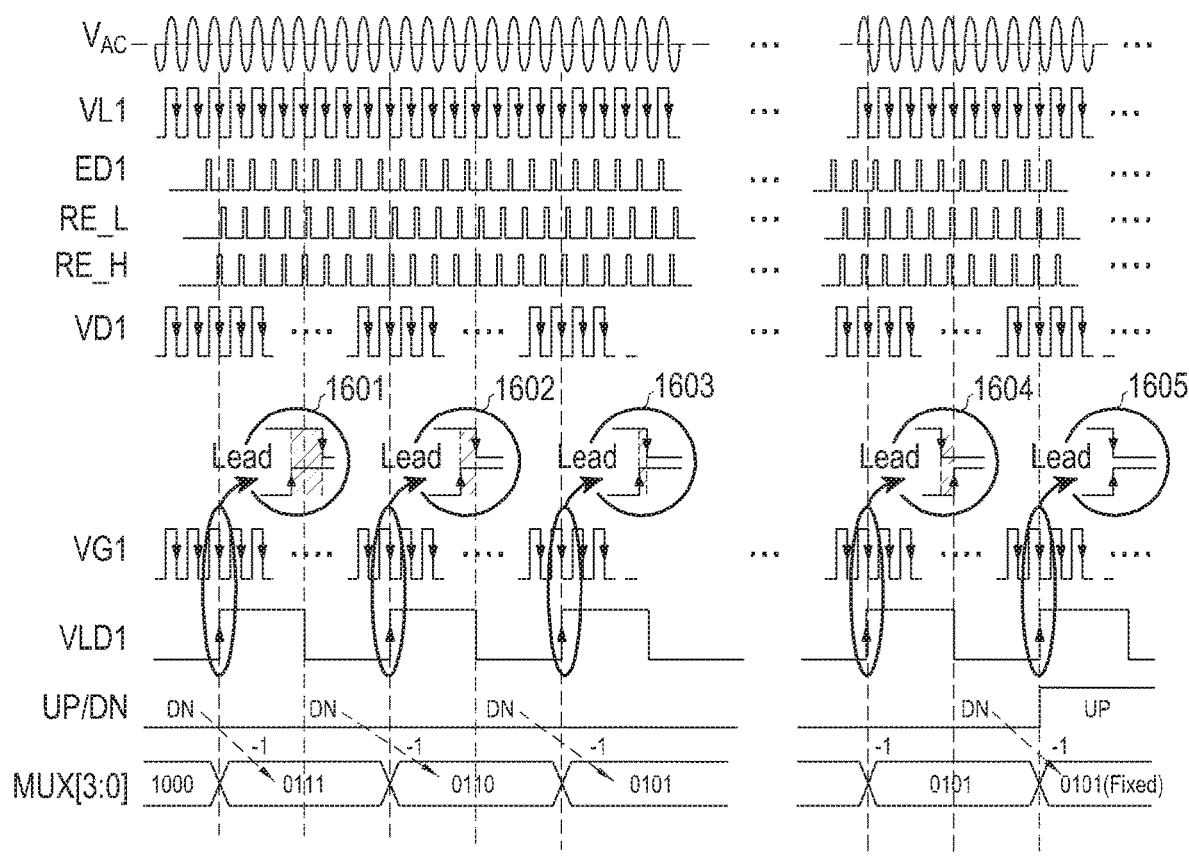
FIG. 16 is a view illustrating signals generated or received according to an embodiment of the disclosure.

FIG. 16 is a view illustrating signals generated or received according to an embodiment of the disclosure.

Referring to FIG. 15, the first OLDC circuit 1401 may include a voltage limiter 1501, a divider (/8 div.) 1502, a digital phase detector 1503, an edge detector 1504, a coarse delay adjuster 1505, a fine delay adjusting cell 1506, a mux 1507, and set-reset (SR) latches 1508 and 1509.

The voltage limiter 1501 may receive an AC voltage $V_{AC}$ from a resonance circuit (or a power reception coil). For example, the AC voltage $V_{AC}$ may have a sinusoidal waveform as shown in FIG. 16. The voltage limiter 1501 may generate a limited voltage VL1 having a square wave from the received AC voltage $V_{AC}$.

Referring to FIG. 16, the limited voltage VL1 may be a square wave with substantially the same phase as the AC voltage $V_{AC}$. The limited voltage VL1 may be supplied to the divider 1502 and the edge detector 1504. The divider 1502 may divide the limited voltage VL1 and produce a divided voltage VLD1. For example, the divided voltage VLD1 produced may be a square waveform that has one half wave within a time corresponding to eight half waves of the limited voltage VL1. For example, where the duty cycle of the first driving voltage VD1 and the fourth driving voltage VD4 varies, it may take a predetermined time for the internal signals of the rectifying circuit to be stabilized. For stable operations, the divider 1502 may divide input signals.

The edge detector 1504 may detect the edge of the limited voltage VL1. The detected edge may be represented as an edge voltage ED1 that has a delta function waveform at the rising edge point of the limited voltage VL1 as shown in FIG. 16. The edge voltage ED1 may be input to the respective set (S) terminals of the SR latches 1508 and 1509. Further, the edge voltage ED1 may be delivered to the coarse delay adjuster 1505. The coarse delay adjuster 1505 may delay the received edge voltage ED1 as per a first unit, and the fine delay cell 1506 may delay the edge voltage ED1, which is output from the coarse delay adjuster 1505, as per a second unit. For example, the first unit may be larger than the second unit. The coarse delay adjuster 1505 may first delay the edge voltage ED1, and the fine delay cell 1506 may second delay the edge voltage ED1 which has undergone the first delay. For example, the fine delay cell 1506 may be constituted of 16 cells. The number of cells to activate a delay may be determined depending on the degree of the delay.

The digital phase detector 1503 may receive the divided voltage VLD1 and the gate voltage VG1 that has already been output from the driver. The digital phase detector 1503 may compare the divided voltage VLD1 with the gate voltage VG1 (1601, 1602, 1603, 1604 and 1605) and may determine, e.g., whether the divided voltage VLD1 leads or lags behind the gate voltage VG1. Further, the digital phase detector 1503 may determine the degree of a difference between the divided voltage VLD1 and the gate voltage VG1. The digital phase detector 1503 may produce one of an up signal or a down signal based on a result of the comparison. The digital phase detector 1503 may produce a MUX[3:0] signal and supply the MUX[3:0] signal to the mux 1507. The MUX[3:0] signal is controlled to increment by one, e.g., when the divided voltage VLD1 lags behind the first gate voltage VG1, thus causing the delay to increase. The MUX[3:0] signal is controlled to decrement by one, e.g., when the divided voltage VLD1 leads the first gate voltage VG1, thus causing the delay to decrease. The delayed signal may be input from the fine delay cell 1506 to the mux 1507, and the delayed signal may be selected by the MUX[3:0] signal. Thus, the first gate voltage VG1 may be synchronized at the falling edge with the limited voltage VL1. This may mean that the received voltage VAC is synchronized with the gate voltage. A low signal RE_L output from the mux 1507 may be a signal that may be obtained by delaying the edge voltage ED1 by the coarse delay adjuster 1505 and the fine delay cell 1506. The low signal RE_L may be supplied to the reset (R) terminals of the SR latches 1508 and 1509 to be used as reset signals for the SR latches 1508 and 1509. The SR latches 1508 and 1509 may output the first driving voltage VD1 for the first gate voltage VG1 and the fourth driving voltage VD4 for the fourth gate voltage VG4.

On the high side, the delay in the fourth driver DRV4 may be longer than the delay in the first driver DRV1, which may result from an influence by the level shifter to turn the VGS of the fourth MOSFET MN4 into, e.g., 5V. Hence, a high signal RE_H may be selected to be, e.g., "0101" smaller than the low signal RE_L. This may be intended to consider the delay difference between the low side and the high side. The comparison by the digital phase detector 1503 may be repeated a designated number of times or may be terminated upon detecting a rising edge of the lock signal (LCK signal). For example, where the divided voltage VLD1 is synchronized in falling edge with the first gate voltage VG1, a rising edge of lock signal may be produced. As set forth above, the falling edge of the received voltage VAC may be consistent with the On/Off time of the MOSFET. Thus, the reverse leakage current may reduce, leading to a significant increase in the rectifying efficiency.

Figure 17:
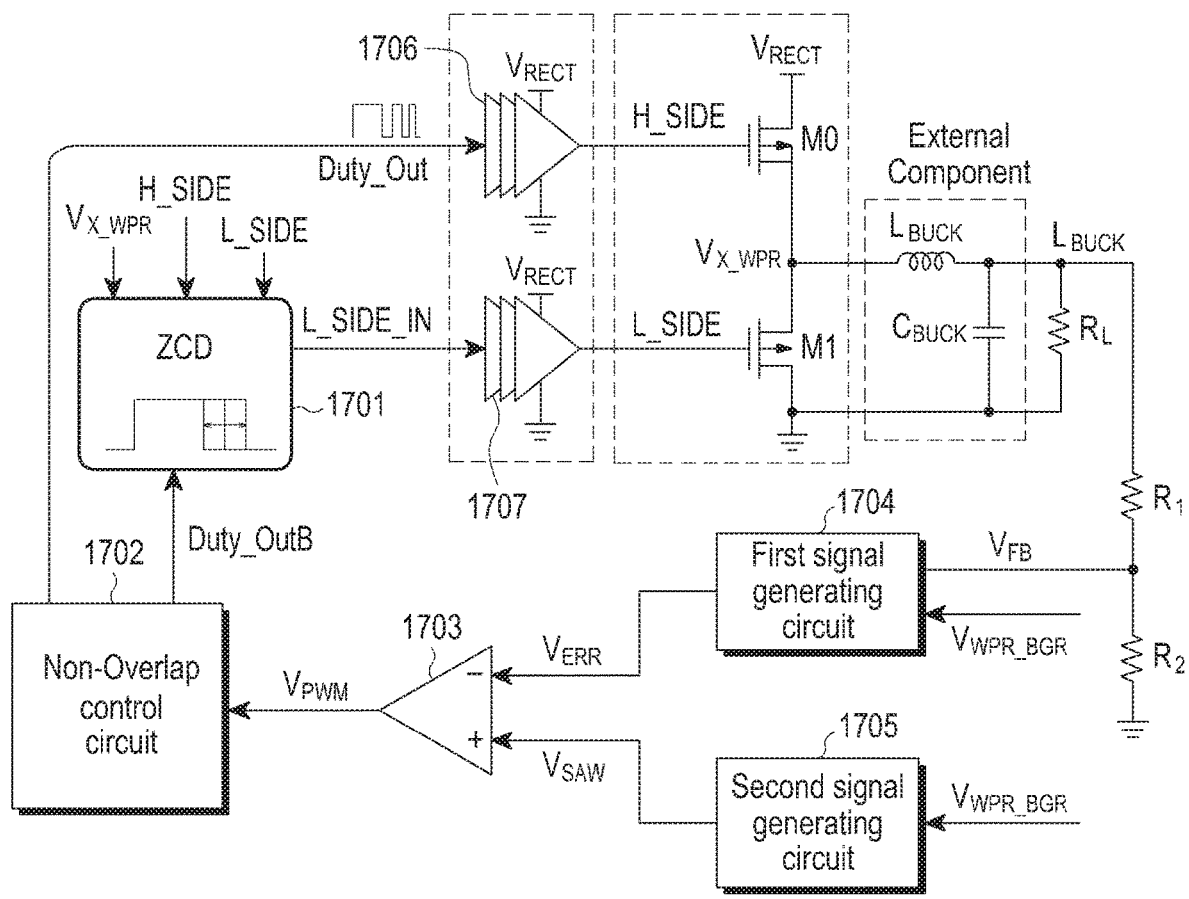
FIG. 17 is a circuit diagram illustrating a converting circuit according to an embodiment of the disclosure.

FIG. 17 is a circuit diagram illustrating a converting circuit according to an embodiment of the disclosure.

Figure 18:
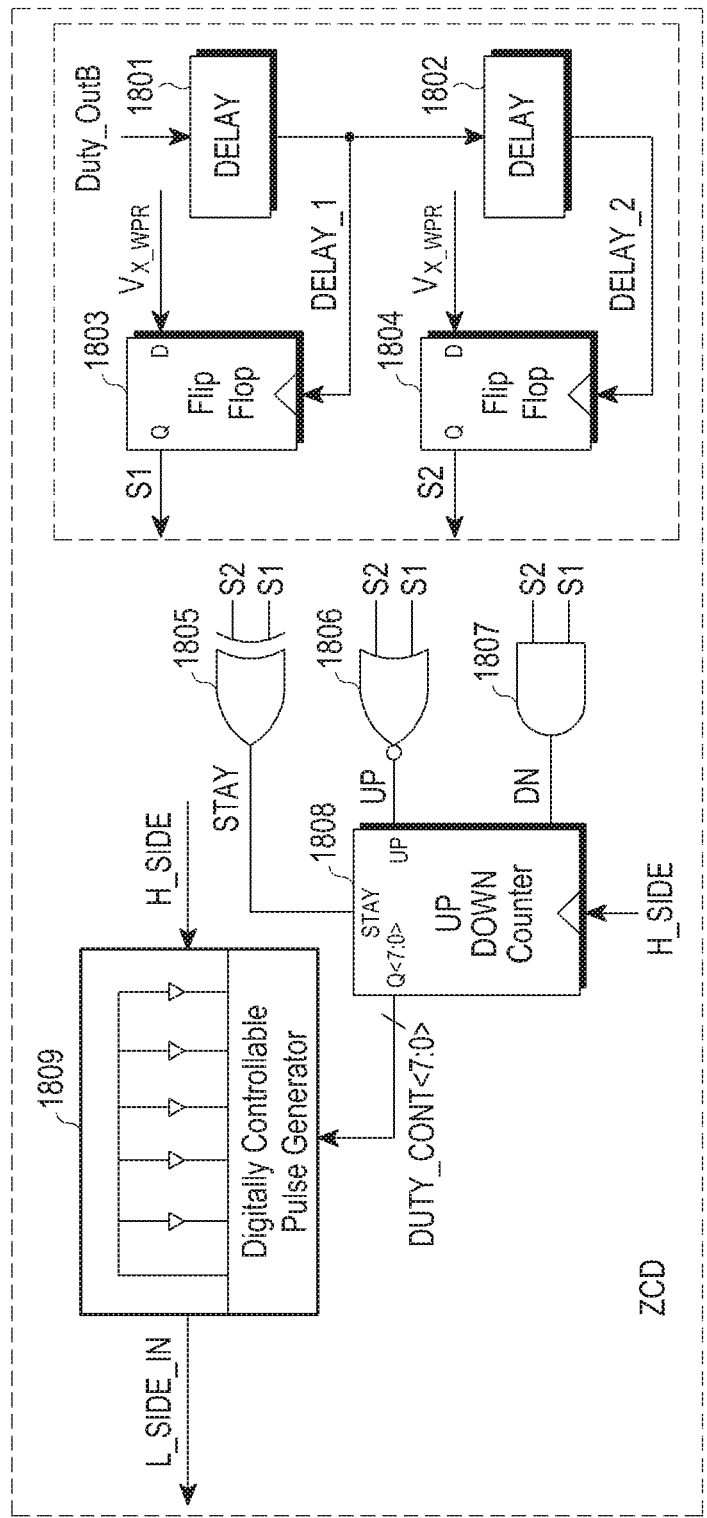
FIG. 18 is a circuit diagram illustrating a zero-current detector (ZCD) according to an embodiment of the disclosure.

FIG. 18 is a circuit diagram illustrating a zero-current detector (ZCD) according to an embodiment of the disclosure.

Referring to FIG. 17, the converting circuit may include a high-side switch M0, a low-side switch M1, a capacitor $C_{Buck}$, an inductor $L_{Buck}$, and a ground terminal. In one cycle, the switch M0 may turn on during a first period and may turn off during a second period. Where the switch M0 turns on, the voltage $V_{X\_WPR}$ may be provided to the inductor $L_{Buck}$. The switch M1 may turn on when the switch M0 turns off and may turn off when the switch M0 turns on. Where the switch M1 turns on, the inductor $L_{Buck}$ may be connected to the ground terminal. The capacitor $C_{Buck}$ may supply a charged voltage $V_{Buck}$ to the load $R_L$. The capacitor $C_{Buck}$ may charge or discharge and the inductor $L_{Buck}$ may operate as a typical buck-converter. Where a relatively low voltage is required for the load $R_L$, the magnitude of the current to flow through the inductor $L_{Buck}$ may be needed to be relatively small. Thus, a zero-current state in which no current flows from the inductor $L_{Buck}$ to the capacitor $C_{Buck}$ is needed for a portion of the cycle.

According to an embodiment of the disclosure, there may be performed a first process in which the inductor $L_{Buck}$ receives and stores a current, a second process in which the inductor $L_{Buck}$ is connected to the ground to apply the current to the capacitor $C_{Buck}$, and a third process in which the inductor $L_{Buck}$ is connected neither to the external power source nor to the ground while the capacitor $C_{Buck}$ alone is connected to the ground. In the first process, the switch M0 may turn on, and the switch M1 may turn off. In the second process, the switch M0 may turn off, and the switch M1 may turn on. In the third process, the switch M0 may turn off, and the switch M1 may turn off. Since no current flows through the inductor $L_{Buck}$ in the third process, this may be called a zero-current state, and the above-mentioned converting mode may be called a discontinuous current mode.

According to an embodiment of the disclosure, a zero-current detector (ZCD) 1701 may provide a low-side input signal L_SIDE_IN for a low-side signal L_SIDE for controlling the On/Off of the switch M1. A driver 1707 may provide the low-side signal L_SIDE produced using the low-side input signal L_SIDE_In to the switch M1. The zero-current detector 1701 may receive a high-side signal H_SIDE, the low-side signal L_SIDE, and the voltage $V_{X\_WPR}$. The zero-current detector 1701 may detect the high-side signal H_SIDE, the low-side signal L_SIDE, and the voltage $V_{X\_WPR}$ and may adjust the low-side input signal L_SIDE_IN. For example, the zero-current detector 1701 may adjust the duty cycle of the low-side input signal L_SIDE_IN so that the low-side signal L_SIDE and the high-side signal H_SIDE are not simultaneously turned on.

The voltage $V_{Buck}$ may be applied to the load RL of the output terminal. The converting circuit may include a resistor R1 and a resistor R2. A voltage $V_{FB}$ may be applied to a node between the resistor R1 and the resistor R2, and the voltage $V_{FB}$ may be determined depending on the load ratio of the resistor R1 to the resistor R2. A first signal generating circuit 1704 may receive the voltage $V_{FB}$ and a reference voltage $V_{WPR\_BGR}$ and may output a first signal $V_{ERR}$ using the voltage $V_{FB}$ and the reference voltage $V_{WPR\_BGR}$. For example, the first signal generating circuit 1704 may generate a first signal $V_{ERR}$ as per a pulse frequency modulation (PFM) scheme. A second signal generating circuit 1705 may also receive the reference voltage $V_{WPR\_BGR}$ and may generate a second signal $V_{SAW}$ in, e.g., a pulse width modulation (PWM) scheme. The second signal generating circuit 1705 may also receive $V_{FB}$. A comparing circuit 1703 may output a signal $V_{PWM}$ based on the two received signals $V_{ERR}$ and $V_{SAW}$. A non-overlapping control circuit 1702 may output a first output signal Duty_Out and a second output signal Duty_OutB so that the signals Duty_Out and Duty_OutB are not simultaneously turned on based on the received signal $V_{PWM}$. The first output signal Duty_Out may be input to a driver 1706, and the driver 1706 may output a high-side signal H_SIDE for controlling the On/Off of the switch M0. The zero-current detector 1701 may generate the low-side input signal L_SIDE_IN based on the received second output signal Duty_OutB.

Referring to FIG. 18, a first delay circuit 1801 may receive the second output signal Duty_OutB and output a first delay signal DELAY_1 that is obtained by delaying the second output signal Duty_OutB. A second delay circuit 1802 may receive the first delay signal DELAY_1 and delay the first delay signal DELAY_1, generating and outputting a second delay signal DELAY_2. The first delay signal DELAY_1 may be input to the clock terminal of a first D flipflop 1803, and the second delay signal DELAY_2 may be input to the clock terminal of a second D flipflop 1804. $V_{X\_WPR}$ may be applied to the respective input terminals of the first D flipflop 1803 and the second D flipflop 1804. Logic values S1 and S2 of the voltage $V_{X\_WPR}$ may be output at sampling points from the respective output terminals of the D flipflops 1803 and 1804, and the logic values S1 and S2 may indicate the sampling points. Determining circuits 1805, 1806, and 1807 may generate determination signals based on the logic values S1 and S2. For example, where S1 and S2 are "00," the determining circuits 1805, 1806, and 1807 may generate UP signals and output the UP signals to a counter 1808. For example, where S1 and S2 are "11," the determining circuits 1805, 1806, and 1807 may generate DN signals and output the UP signals to the counter 1808. For example, where a designated number or more of UP signals or DN signals are repeatedly generated, the determining circuits 1805, 1806, and 1807 may output STAY signals. While monitoring the voltage $V_{X\_WRP}$ at the node for the switching of the switch M1 at each cycle, the zero-current detector 1701 may detect the current that was applied to the inductor at the switching-off time in the previous cycle. The zero-current detector 1701 may continuously detect the first delay signal DELAY_1 and the second delay signal DELAY_2 and the voltage $V_{X\_WPR}$ at the node. Accordingly, although the values S1 and S2 are varied as the load changes, the zero-current detector 1701 may detect when the current applied to the inductor becomes 0 A while controlling the counter 1808 and the second output signal Duty_OutB. As the zero-current detector 1701 operates, the counter 1808 counts the UP signals/DN signals and may accordingly output a duty control signal DUTY_CONT<7,0> to a digital control pulse generator 1809. The digital control pulse generator 1809 may generate and output the low-side input signal L_SIDE_In based on the high-side signal H_SIDE and the duty control signal DUTY_CONT<7,0>. The input signal L_SIDE_IN may be provided to the driver 1807. As set forth above, the converting circuit may convert the voltage of rectified power using a relatively low level of power. Further, the converting circuit according to an embodiment of the disclosure may reduce a loss that an existing converting circuit with a comparator would cause due to a zero-current sensing timing error that may result from an offset.

Each of the aforementioned components of the wireless power transmitter or electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into a single entity, but the entity may perform the same functions as the separated components perform.

The term 'module' may refer to a unit including one of hardware, software, and firmware, or a combination thereof. The term 'module' may be interchangeably used with a unit, logic, logical block, component, circuit, processor or plurality of processors. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor or plurality of processors, may cause the processor to carry out a corresponding function. The computer-readable storage medium may be e.g., the memory 130.

According to an embodiment of the disclosure, there is provided a storage medium storing commands configured to be executed by at least one processor to enable the at least one processor to perform at least one operation that may include wirelessly receiving power, obtaining a magnitude of the received power, selecting a rectifying circuit to perform rectification from among the plurality of rectifying circuits based on the magnitude of the received power, and rectifying the received power using the selected rectifying circuit.

The above-described commands may be stored in an external server and may be downloaded and installed on an electronic device, such as a wireless power transmitter. According to an embodiment of the disclosure, the external server may store commands that are downloadable by the wireless power transmitter.

The transitory or non-transitory computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out exemplary embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

As is apparent from the foregoing description, according to various embodiments of the disclosure, there may be provided an electronic device including a rectifying circuit which is able to prevent the forward loss and reverse leakage loss and a method for operating the electronic device. Thus, the power processing efficiency may increase, and the electronic device may less heat up.

The embodiments disclosed herein are proposed for description and understanding of the disclosed technology and do not limit the scope of the disclosure. Accordingly, the scope of the disclosure should be interpreted as including all changes or various embodiments based on the technical spirit of the disclosure.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
   a receiving circuit configured to wirelessly receive power and output alternating current (AC) power;
   a rectifying circuit configured to rectify the AC power from the receiving circuit, wherein the rectifying circuit comprises a first p-type metal-oxide-semiconductor field-effect transistor (P-MOSFET) configured to:
      transfer a positive amplitude of power to an output terminal of the rectifying circuit while the AC power has the positive amplitude, and
      prevent transferring a negative amplitude of power to the output terminal of the rectifying circuit while the AC power has a negative amplitude; and
   a forward loss compensating circuit connected with the first P-MOSFET and configured to reduce a threshold voltage of the first P-MOSFET while the AC power has the positive amplitude.

2. The electronic device of claim 1, wherein the forward loss compensating circuit comprises a first switch configured to connect a gate of the first P-MOSFET to an input terminal of the rectifying circuit while the AC power has the positive amplitude.

3. The electronic device of claim 2, wherein the first switch is further configured to connect a source of the first P-MOSFET to the gate of the first P-MOSFET while the AC power has the positive amplitude.

4. The electronic device of claim 3, wherein the first switch comprises a first n-type MOSFET (N-MOSFET), the N-MOSFET having a source connected to the gate of the first P-MOSFET and a drain and a gate which are connected to the input terminal and the source of the first P-MOSFET.

5. The electronic device of claim 4, wherein the first switch is further configured to prevent connecting the gate of the first P-MOSFET to the input terminal of the rectifying circuit while the AC power has the negative amplitude.

6. The electronic device of claim 1, further comprising:
   a reverse loss compensating circuit connected to the first P-MOSFET,
   wherein the reverse loss compensating circuit is configured to apply a voltage not less than a designated value to a gate of the first P-MOSFET while the AC power has the negative amplitude.

7. The electronic device of claim 6, wherein the reverse loss compensating circuit comprises a second switch configured to connect the gate of the first P-MOSFET to the output terminal of the rectifying circuit while the AC power has the negative amplitude.

8. The electronic device of claim 7, wherein the second switch is further configured to connect a drain of the first P-MOSFET to the gate of the first P-MOSFET while the AC power has the negative amplitude.

9. The electronic device of claim 8, wherein the second switch is further configured to prevent connecting the drain of the first P-MOSFET to the gate of the first P-MOSFET while the AC power has the positive amplitude.

10. The electronic device of claim 7, wherein the second switch comprises a second P-MOSFET having a source connected to the gate of the first P-MOSFET, a gate connected to a source of the first P-MOSFET and the input terminal of the rectifying circuit, and a drain connected to the drain of the first P-MOSFET and the output terminal.

11. The electronic device of claim 1, wherein the forward loss compensating circuit comprises:
- a capacitor having a first end connected to a gate of the first P-MOSFET and a second end connected to a ground, and
- a third P-MOSFET having a gate connected to the gate of the first P-MOSFET, a source connected to a drain of the first P-MOSFET and the output terminal, and a drain connected to the gate of the first P-MOSFET.

\* \* \* \* \*